United States Patent [19]
Peters et al.

[11] Patent Number: 5,541,653
[45] Date of Patent: Jul. 30, 1996

[54] METHOD AND APPARTUS FOR INCREASING RESOLUTION OF DIGITAL COLOR IMAGES USING CORRELATED DECODING

[75] Inventors: John D. Peters, Sunnyvale; Hewitt D. Crane, Portola Valley; Eugenio Martinez-Uriegas, Palo Alto, all of Calif.

[73] Assignee: SRI International, Menlo Park, Calif.

[21] Appl. No.: 401,825

[22] Filed: Mar. 10, 1995

Related U.S. Application Data

[63] Continuation-in-part of Ser. No. 97,510, Jul. 27, 1993, Pat. No. 5,398,066.

[51] Int. Cl.⁶ .......................... H04N 5/247; H04N 11/02
[52] U.S. Cl. .......................... 348/264; 348/393
[58] Field of Search .......................... 348/264, 391–393, 348/453; 382/166, 167; H04N 5/247, 11/02

[56] References Cited

U.S. PATENT DOCUMENTS

| | | |
|---|---|---|
| 4,056,737 | 11/1977 | Sequin . |
| 4,238,765 | 12/1980 | Nagumo . |
| 4,520,386 | 5/1985 | Asaida . |
| 4,553,165 | 11/1985 | Bayer . |
| 4,591,900 | 5/1986 | Heeb et al. . |
| 4,630,105 | 12/1986 | Knop . |
| 4,654,484 | 3/1987 | Rieffel et al. .......................... 348/393 |
| 4,845,553 | 7/1989 | Konomura .......................... 348/393 |
| 4,989,959 | 2/1991 | Plummer . |
| 5,010,504 | 4/1991 | Lee et al. . |
| 5,095,364 | 3/1992 | Asaida et al. . |
| 5,109,271 | 4/1992 | Borgers et al. .......................... 348/393 |
| 5,206,717 | 4/1993 | Sakata et al. .......................... 348/264 |
| 5,374,955 | 12/1994 | Furuhata .......................... 348/264 |
| 5,414,465 | 5/1995 | Kodama et al. .......................... 348/264 |

*Primary Examiner*—Victor R. Kostak
*Attorney, Agent, or Firm*—Townsend and Townsend and Crew

[57] ABSTRACT

Color image compression and decompression is achieved by either spatially and chromatically multiplexing three digitized color planes, such as RGB (Red-Green-Blue) (22), into a digital array representative of a single digitized spatially- and chromatically-multiplexed plane (32, 813*f*) through use of a data processor or through use of a multi-sensor CCD imaging device with a sensor offset (800), or, by use of a color imaging device, capturing an image directly into a single spatially-multiplexed image plane, for further compression, transmission and/or storage. A decoder (50, 807, 923) extracts, from the stored or transmitted image, data to restore each of the color planes. Specific demultiplexing techniques involve correlating information of other planes with the color plane to be demultiplexed. Various techniques of entropy reduction, smoothing and speckle reduction may be used together with standard digital color compression techniques.

17 Claims, 22 Drawing Sheets

METHOD AND APPARTUS FOR INCREASING RESOLUTION OF DIGITAL COLOR IMAGES USING CORRELATED DECODING

This application is a continuation-in-part of the application Ser. No. 08/097,510, filed Jul. 27, 1993, now U.S. Pat. No. 5,398,066, incorporated herein by reference for all purposes.

BACKGROUND OF THE INVENTION

This invention relates to the encoding and decoding of digitized color images with applications to compression, transmission, reception, storage, and improving image quality.

In a digital image, a representation of an image is stored and transmitted as an array of numerical values. The image is divided up into a grid. Each small square in the grid is referred to as a pixel. The intensity of the image at each pixel is translated into a numerical value which is stored in an array. The array of numerical values representing an image is referred to as an image plane.

Black and white (gray scale) images are commonly represented as a two-dimensional array where the location of a pixel value in the array corresponds to the location of the pixel in the image. Each location in the array for gray scale images can commonly store a number, for example, an integer value of between 0 and 255 (an 8-bit binary number). This means that there can be 1 of 256 different gray levels displayed at each pixel in the image.

Color images are commonly represented by three two-dimensional arrays. Each array (or plane) represents one of the primary colors, e.g., red, green, or blue. The planes overlap so that each pixel in the displayed image displays a composite of a red, green, and blue value at that pixel. In a common 24-bit color system, each pixel in each of the three planes can store a value of between 0 and 255. This means that there can be 1 of $256^3$ or 16 million different colors displayed at each pixel. Typical digital color images can range in size from $10^7$ bits/image (a TV frame) to $10^{10}$ bits/image (a satellite image) thus posing problems for efficient storage and transmission.

In practice the number of bits required to represent the information in realistic digital images may be greatly reduced without significant loss in perceived quality by taking advantage of the fact that in ordinary images the pixel values tend to be strongly redundant in three domains: spectral (because pixel values from different spectral bands—e.g., RGB—are generally highly correlated); spatial (because neighboring pixels also tend to be highly correlated); and, for dynamic images, temporal (because consecutive frames tend to be very similar). Image compression techniques can reduce the number of bits required to represent images by removing these redundancies. There is a wide variety of such techniques, but they can be divided into two classes: lossless and lossy.

In lossless compression the image reconstructed after compression is numerically identical, pixel by pixel, to the original image. The criteria for comparison of lossless techniques are based on objective measures such as compression ratio, compression speed, and computational complexity. In lossy compression, the reconstructed image is degraded with respect to the original image in order to attain higher compression ratios than those of lossless procedures. The degradation may or may not be apparent to a human viewer, but even when noticeable it may be acceptable in some applications, although not in others. The criteria for visual quality of compressed images are diverse and subjective; thus, caution must be exercised in comparing lossy compression schemes. This invention is directed to lossy compression of full-color images and to decoding and processing multi-spectral data sets that are highly correlated.

A widely used current standard for still-image compression is a baseline system specified by the published and generally available works of the Joint Photographic Experts Group (JPEG). The JPEG system is essentially single-plane, or monochrome. Thus, for color (or, more generally, for multispectral) images, the JPEG standard encodes each component independently. This is seldom optimal, however, because in most cases there is significant correlation in the information contained in different planes of the same image. In the case of color images intended for human viewing, JPEG suggests that the original RGB image components be decorrelated by linear transformation into YIQ planes where Y represents luminance or the black and white component of the image, and I and Q represent the chrominance or color components, which are typically subsampled. After this transformation, the JPEG standard performs a spatial frequency compression of the Y and of the sub-sampled I and Q components independently to compress the data. This compression occurs as follows. First, the three planes are divided into blocks of 8×8 pixels and a discrete cosine transform (DCT) is computed independently for each block. Second, the coefficients of the transformed blocks are weighted in accordance with the number of bits allocated by a Quantization Matrix for each spatial frequency; independent Quantization Matrices are used for the luminance (Y) and chrominance (I and Q) planes, but the same matrix is used throughout each plane. Third, code-length (Huffman) encoding is applied to the quantized coefficients. Decompression follows an inverse procedure to obtain an RGB color image according to standard techniques known to the art.

A major disadvantage of this approach for digital images is the required translation from an RGB representation to a YIQ representation. The YIQ system was designed to reduce the amount of analog information required to be broadcast for color TV by translating the RGB color signals into the three signals Y, I, and Q. Because human vision has much more spatial resolution sensitivity to the Y (or luminance) component than to the I and Q (or chrominance) components, a very acceptable color picture can be broadeast by assigning most of the bandwidth available in a TV channel to the luminance signal.

While such a translation has worked well for analog color TV broadcasting, it poses at least one major disadvantage for digital color systems. In analog signal processing, multiplication is a very simple and fast process. However, in digital processing, multiplication tends to be complex, slow, and expensive. The conversion processes from RGB to YIQ are based on transformations of the form:

$$\begin{vmatrix} Y \\ I \\ Q \end{vmatrix} = \begin{vmatrix} a_{11} & a_{12} & a_{13} \\ a_{21} & a_{22} & a_{23} \\ a_{31} & a_{32} & a_{33} \end{vmatrix} \cdot \begin{vmatrix} R \\ G \\ B \end{vmatrix}$$

and $$\begin{vmatrix} R \\ G \\ B \end{vmatrix} = \begin{vmatrix} b_{11} & b_{12} & b_{13} \\ b_{21} & b_{22} & b_{23} \\ b_{31} & b_{32} & b_{33} \end{vmatrix} \cdot \begin{vmatrix} Y \\ I \\ Q \end{vmatrix}$$

where the 3 by 3 matrices are inverses of each other. Determining the Y, I, and Q components corresponding to the R, G, and B components at any pixel location requires nine multiplications per pixel. The same is true with regard to the reverse transformation, i.e., a requirement in general of nine multiplications per pixel. This represents a significant computational burden for practical systems.

Some prior art digital color image systems have incorporated CCD type cameras with a mosaic color filter covering the CCD array. These cameras, by their inherent nature, produce a representation of an image that contains just one color component at every pixel. The arrangement of the components is determined by the mosaic pattern in the filter. Thus far, these prior art systems have not directly compressed or transmitted the multiplexed image produced by the mosaic filter pattern but have instead converted the multiplexer RGB image produced by the filter pattern to a YIQ or CMY type of system before processing. What is done in the present invention is to operate on the RGB signals directly, preserving color resolution as well as spatial resolution while reducing the number of bits required for storage and/or transmission of a bit-mapped image.

SUMMARY OF THE INVENTION

According to the invention, a digital multi-spectral image is compressed by spatially and chromatically multiplexing at least two digitized multi-spectral planes consisting for example of RGB (Red-Green-Blue) into a digital array representative of a single digitized spatially- and chromatically-multiplexed plane, or, by use of a color imaging device, directly capturing an image into a single spatially-multiplexed image plane, for further compression, transmission and/or storage. A color imaging device may be a multi-receptor device with an off-set among receptors in which case the invention effectively increases the resolution of the captured image by decompressing the data from the imaging device. A color imaging device may also be an imaging device that contains only two sensors, say one for R and one for G, for use in special applications such as processing bank documents where material written or stamped in red (or another color) must be distinguishable from other writing. A demultiplexer separately extracts from the stored or transmitted data representing the multiplexed image all of the values for all of the multi-spectra planes according to techniques that may vary depending on the specifics of the multiplexing procedure. Specific demultiplexing techniques involve correlating information of other planes with each color plane as it is being demultiplexed. Various techniques of entropy reduction, image smoothing, and speckle reduction may be used together with but independent of standard compression techniques, such as single-plane (or black and white) JPEG. For example, using single-plane JPEG in its lossless mode, a total of about 6:1 data compression may be achieved with no loss in perceived image quality beyond that from the initial multiplexing. Using single-plane lossy JPEG, substantial data compression is achievable, with a corresponding degradation of perceived image quality that depends on the amount of compression. Using a multi-receptor imaging device with offset, significant image resolution improvement is achieved through image demultiplexing/decompression with only minor hardware modifications to the imaging device.

The multiplexing and demultiplexing approach of this invention was in part motivated by a recognition of the kind of neural processing that evolved in mammalian visual systems. Human vision is trichromatic, which means that to match the appearance of any patch of light, the human eye requires a weighted mixture of at least three primaries. The physiological evidence for this is that the human retina has three different types of photoreceptors (cones) for daylight performance. The need for three components (Red, Green and Blue or RGB) in CRT color imagery arises from this human trichromancy. The standard for digital color images, a set of three overlapping arrays of numbers, which represent the three RGB values at each point (pixel) of the image, does not correspond to the actual retinal organization where the three types of cones are not arranged in three overlapping tiers, one for each type, but in a single tier in which the three types of cones are interspersed or multiplexed. Also, signals from cone cells are not independently processed but interact locally by converging upon deeper retinal neurons; moreover, the neural encoding of luminous changes and color changes in the image are not independent. Instead, for each point in the retina, the chromatic and achromatic changes of the light falling upon it are processed in a multiplexed local fashion by the retinal neurons serving that point.

The present invention takes advantage of this understanding of the mammalian visual system to achieve efficient transmission, storage and processing of digital color images at a reduced cost by reducing the amount of data that must be transmitted and stored for each image. The design of a retina-like single layer for multiplexing requires simultaneous sampling of position and color in the original image—and hence the name spatiochromatic, a term borrowed from vision research.

The present invention will be described with reference to the handling of realistic color images encoded in the RGB color primaries. However, it will be apparent to one of ordinary skill in the art that there are alternative multi-spectral uses for the invention. One alternative would be to use the invention in a color system that employs primaries other than RGB for color representations, such as systems that use cyan, magenta, and yellow. Another alternative would be to use the invention in systems that process different types of multi-spectral dam, such as images from a satellite, images from infra-red detectors or images from x-ray detectors.

The invention will be better understood upon reference to the following detailed description in connection with the accompanying drawings.

DESCRIPTION OF THE PREFERRED EMBODIMENT

Definitions and Terminology Related to Digital Image Processing and Compression In the specification, the uppercase letters R, G, B, M, Y, I, and Q are used to indicate two-dimensional arrays of values representing an image or a separable component of an image. The two-dimensional arrays of values are also referred to as "planes." For example, the R plane refers to a two-dimensional array of values that represent the red component at every location (pixel) of an image. The letter groups RGB and YIQ indicate three-dimensional arrays of values representing an image as a composite of overlaid separable image component planes.

Uppercase letters used with an asterisk (*) (such as RGB*, M*, R*, G*, or B*) are used to indicate an array of values representing an image or a separable component of an image after some type of processing has been done to the image values.

The lowercase letters r, g, and b are used to refer to an individual pixel in an image plane. These letters are used with a subscript s ($r_s$, $g_s$, or $b_s$) to indicate a pixel value that is directly sampled from the original image and is not changed. These letters are used with a subscript c ($r_c$, $g_c$, or $b_c$) to indicate a pixel value that is computed by a component of the image decompression system of the invention. The letter b is used with a subscript a ($b_a$) to indicate a weak plane pixel value in the M plane which is an average of a submatrix of the original weak plane computed when the image is multiplexed. The letter r is used with a subscript sc ($r_{sc}$) to indicate a red plane pixel value in the demultiplexed R* plane that is a computed red value and that is used as if it were a sampled value in a part of the correlated decoding.

Angle brackets <> are used to indicate a local average value computed from the pixels in a local submatrix of an image plane.

The term "strong plane" refers to one of the separable planes of an image which retains many of its original values (about 30% to about 65%) after being spatially sampled for multiplexing, for example, a plane sampled at a rate of 6 to 10 pixels out of each 16 pixels. The term "weak plane" refers to one of the separable planes of an image that retains relatively less original values than the strong planes after being spatially sampled for multiplexing, for example, a plane sampled at a rate of up to about 30%, always less than the strong plane sampling, such as only 1 to 5 pixels out of each 16 pixels in a three-plane system. A "weak plane" is a plane which can only be decoded effectively as a function of the multiple associated strong planes.

System Overview

Figure 1:
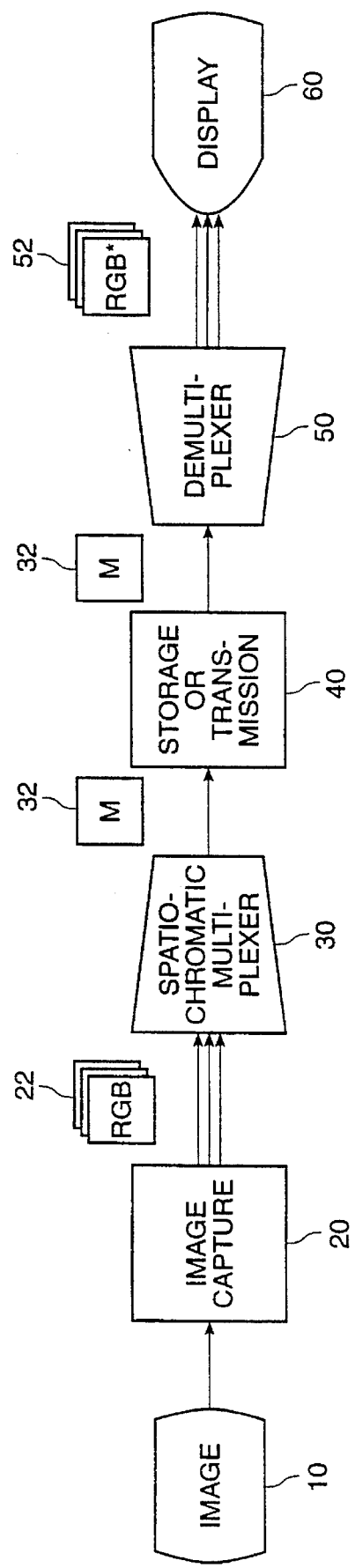
FIG. 1 is a block diagram of a data compression system employing basic multiplexing and demultiplexing processes according to the invention.

FIG. 1 is a block diagram of a specific embodiment of an image compression and decompression system incorporating the present invention. A full color scene 10 is presented to image capturing means 20. Capture means 20 captures a multispectral image with data from a plurality of discrete spectral components (e.g. R, G, & B) captured at every picture element (pixel) location. Capture means 20 may be a digital scanner coupled to a random process memory, or it may be any type of analog or digital camera coupled to a storage means such as a computer memory or a magnetic or optical recording medium. Capture means 20 may also be a means for receiving an image that had previously been stored in a random access memory, on video tape, or a laser disk, etc., or for receiving an image created by a computer. The representation of the image in the image capture means 20 in this example is a three-plane RGB array, indicated by icon 22.

Once the image is present in the capture means 20, it is presented to image multiplexer 30, which constructs a new data representation of the image 32, called an M plane (for "multiplexed" plane), by, in one embodiment, extracting at every pixel information regarding just one spectral component of the image. For an image made up of three separable spectral components, multiplexer 30 therefore "compresses" the data needed to represent the source image to ⅓ the size of the original data based on a three-plane source representation. This compressed data is then received by transmission or storage means 40, which can be any means known for transmitting or storing electronic information. An advantage associated with this invention is that in transmitting or storing the image, only ⅓ the data that would have been necessary without encoding is required. After transmission or storage, decoder 50 expands and decodes the compressed data to recover RGB* plane 52, which is a close approximation of the full data set initially captured in capture means 20. That data set is presented to display device 60 which displays the data for viewing.

Figure 2:
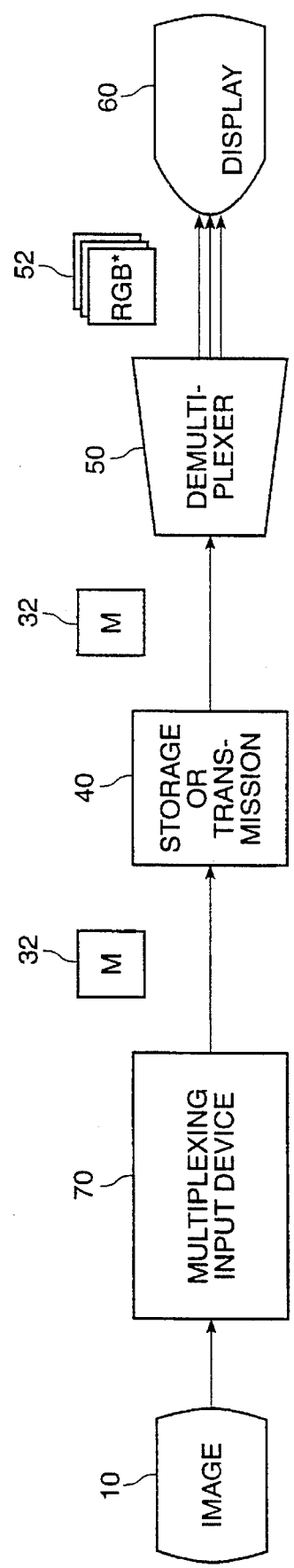
FIG. 2 is a block diagram of an alternative embodiment data compression system employing a multiplexing input device.

FIG. 2 is a block diagram of an alternative embodiment of the invention which uses a multiplexing input device 70. Multiplexing input device 70 can be any means known for directly capturing a multiplexed plane from an image, such as a CCD sensor camera with a mosaic color filter, or, in an embodiment described more fully below, a multi-sensor CCD camera with an off-set among the sensors. In this embodiment, the image never exists as a full RGB plane before being multiplexed into an M plane. The M-plane output of multiplexing input device 70 is directly input to storage or transmission means 40. Demultiplexer 50 receives this output and demultiplexes it to produce RGB* planes 52 which are a close approximation of what a full RGB representation of the image would have looked like. In one embodiment, the present invention uses a unique mosaic filter arrangement and processing to achieve high levels of image compression and superior image reproduction with a minimum of computational overhead. In another embodiment, the present invention uses a multi-sensor CCD camera with an off-set among sensors as a multiplexing input device.

The detailed operation of the elements of the invention illustrated in FIG. 1 and FIG. 2 will now be explained.

Image Multiplexing

Figure 3:
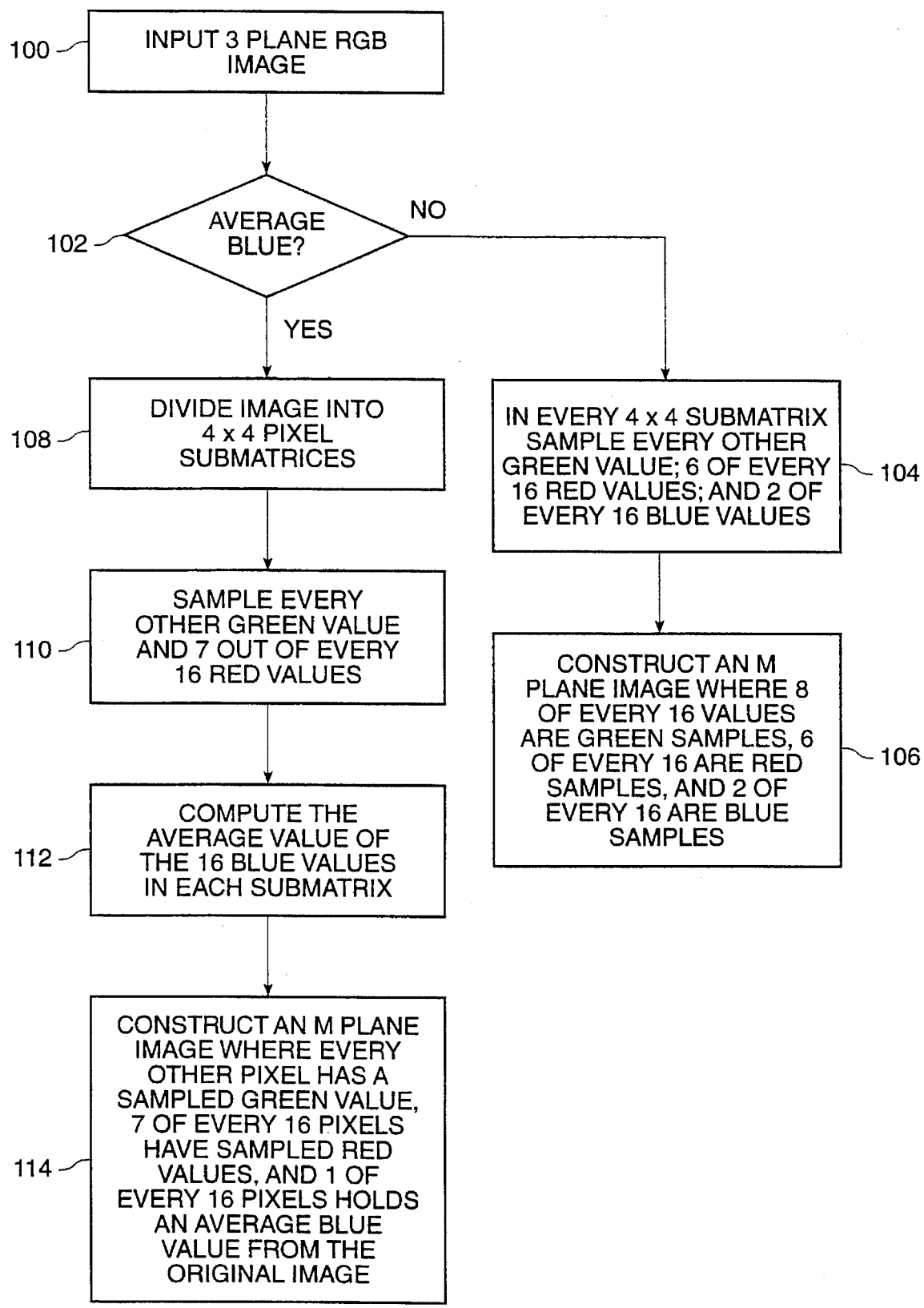
FIG. 3 is a block diagram illustrating the operation of the multiplexer of the present invention.

FIG. 3 is a flow chart of the operations of multiplexer 30 according to one embodiment of the invention. Multiplexer 30 can be implemented in a variety of technologies as well as be emulated by a computer program.

The operation of multiplexer 30 will now be explained with reference to the flow chart illustrated in FIG. 3.

Multiplexer 30 first receives an input which is a representation of a color image in three separable planes (Step 100). Next, a determination is made as to whether the weak plane (blue) pixels stored in the M plane will represent sampled pixels from the source image or will represent an average of weak plane pixels from the source image (Step 102).

This determination allows for there to be two alternative methods of operation based on whether the weak plane pixels are sampled or average values from the source image. According to the invention, better image quality is obtained after decoding when the weak plane (blue) values stored in the M plane are a local average of the weak plane pixels from the original source image. However, to do this averaging requires additional processing by multiplexer 30 which may not be desirable in all applications. The determination as to which method to use in Step 102 may be selectable by a user in some applications and may be fixed in others.

Figure 5:
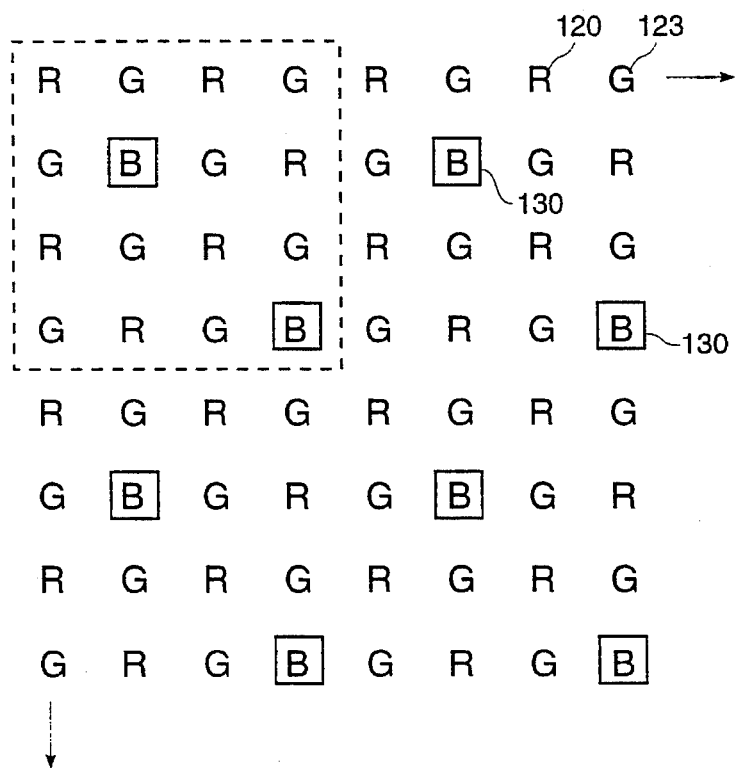
FIG. 5 is a diagram of a multiplexed plane of digital data according to a second embodiment of the invention. (RGB 6:8:2)

If the test made in Step 102 is answered NO and weak plane averaging is not used, multiplexer 30 then samples in the three planes of the source image every other green pixel, six out of every sixteen red pixels, and two out of every sixteen blue pixels (Step 104). (These pixels are sampled in accordance with a specific pattern, which is illustrated in FIG. 5 described below.) Multiplexer 30 uses these sampled pixel values to construct an M plane representation of the image by inserting the sampled green, red, and blue values in their corresponding locations in the M plane, thus creating an M plane where red, green, and blue pixels are in the ratio 6:8:2.

If the test made in Step 102 is answered YES and weak plane averaging is used, multiplexer 30 operates on the source image in accordance with Steps 108 to 114. First, multiplexer 30 divides the source image into 4×4 pixel blocks or submatrices (Step 108). Multiplexer 30 then samples every other green pixel and seven out of every sixteen red pixels (Step 110). Next, multiplexer 30 computes a local average for the blue values in each 4×4 submatrix by summing the sixteen blue values in that submatrix and dividing by sixteen (Step 112). Multiplexer 30 uses these sampled green and red pixel values and the blue local average values to construct an M plane representation of the image by inserting the sampled red and green values in their corresponding locations in the M plane and inserting the local average of the blue values in the designated position of each 4×4 pixel submatrix in the M plane (Step 114). Multiplexer 30 thereby creates an M plane where red, green and blue pixels are in the ratio 7:8:1.

The M Plane

Figure 4:
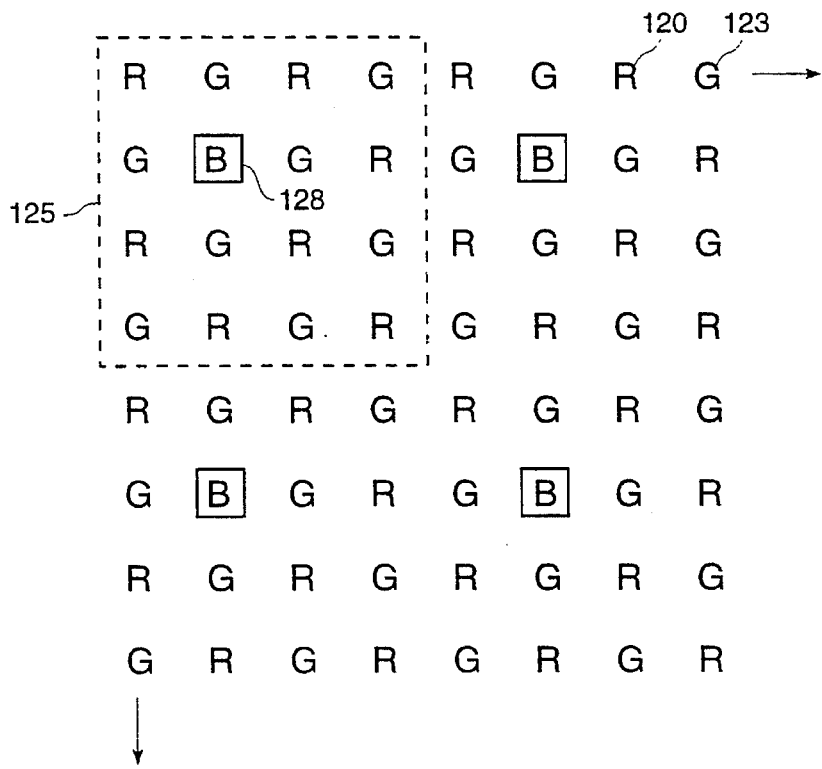
FIG. 4 is a diagram of a multiplexed plane of digital data according to a first embodiment of the invention. (RGB 7:8:1)

FIG. 4 is a diagram of an 8×8 pixel region in the spatiochromatically multiplexed image plane (M plane 32) which is the output of spatiochromatic multiplexer 30 of FIG. 1 when weak plane averaging is used by multiplexer 30. The letters R, G and B in FIG. 4 each represent the location of one pixel in the M plane and indicate the color component that is stored at that location. For example, R pixel 120 stores a value $r_s$ which is the sampled value of the red component from that location in the original source RGB planes. Likewise, G pixel 123 stores the sampled green component $g_s$ from the RGB plane at that location. B pixel 128 stores a value $b_a$ which is the average of the sixteen blue values in a submatrix (indicated by dashed line 125) from the original image. The M plane uses ⅓ of the data space to represent the image as did the original RGB planes, because each pixel R, G, or B in the M-plane stores the value of only one of the 3 RGB planes and discards the value of the other two planes. Thus 3 to 1 data compression is achieved from the spatiochromatic multiplexing.

FIG. 5 is a diagram of an 8×8 pixel region in the spatiochromatically multiplexed image plane (M plane 32) which is the output of multiplexing input device 70 and is also the output of spatiochromatic multiplexer 30 when not using blue averaging. The R and G pixels in the M-plane in FIG. 5 are identical in operation to those pixels as described with reference to FIG. 4. The B pixels 130 however, do not hold an average blue value, but instead hold values $b_s$ which are also directly sampled from the original RGB image.

FIG. 5 also represents the positioning of the red, green and blue filters that would be used in a filter mosaic of a multiplexing input device 70 built according to the present invention. Note that use of a multiplexing input device precludes the use of weak plane averaging because the only blue values that are ever captured digitally are the blue values that fall on the two B filters for each 4×4 block in FIG. 5.

Two major factors underlie the form of the sampling mosaic shown in FIGS. 4 and 5. First with respect to the RGB color primaries, there is evidence that the human eye is more sensitive to the G primary than to the R primary, and much less sensitive to the B primary. This is roughly taken into account in the mosaic design by the RGB ratio of 7:8:1 in FIG. 4 and 6:8:2 in FIG. 5. The invention in this embodiment therefore defines two strong planes, R and G, and one weak plane, B. Second, one strict aspect of the standardized JPEG scheme is the basic 8×8 size of pixel blocks, which defines the range of the basis functions for the cosine transform. Because the 4×4 mosaic cell shown in FIGS. 4 and 5 is a submultiple of the standard, any possible phase-induced effects of multiplexing would not be present with respect to the JPEG basis functions required to transform the image into the spatial-frequency domain.

While two particular arrangements of pixels in a multiplexed M plane have been described, the invention can be practiced as described herein with alternative arrangements of pixels in the maltiplexed plane which preserve the concept of strongly sampled and weakly sampled plumes.

The transmitting or storing means 40 takes advantage of the compression resulting from the reduced size of the M plane to effectively transmit or store the image using just ⅓ the data space that would be needed to handle the uncompressed image. After transmission or storage, the M plane is decoded in order to display the original image.

Image Decoding

Figure 6:
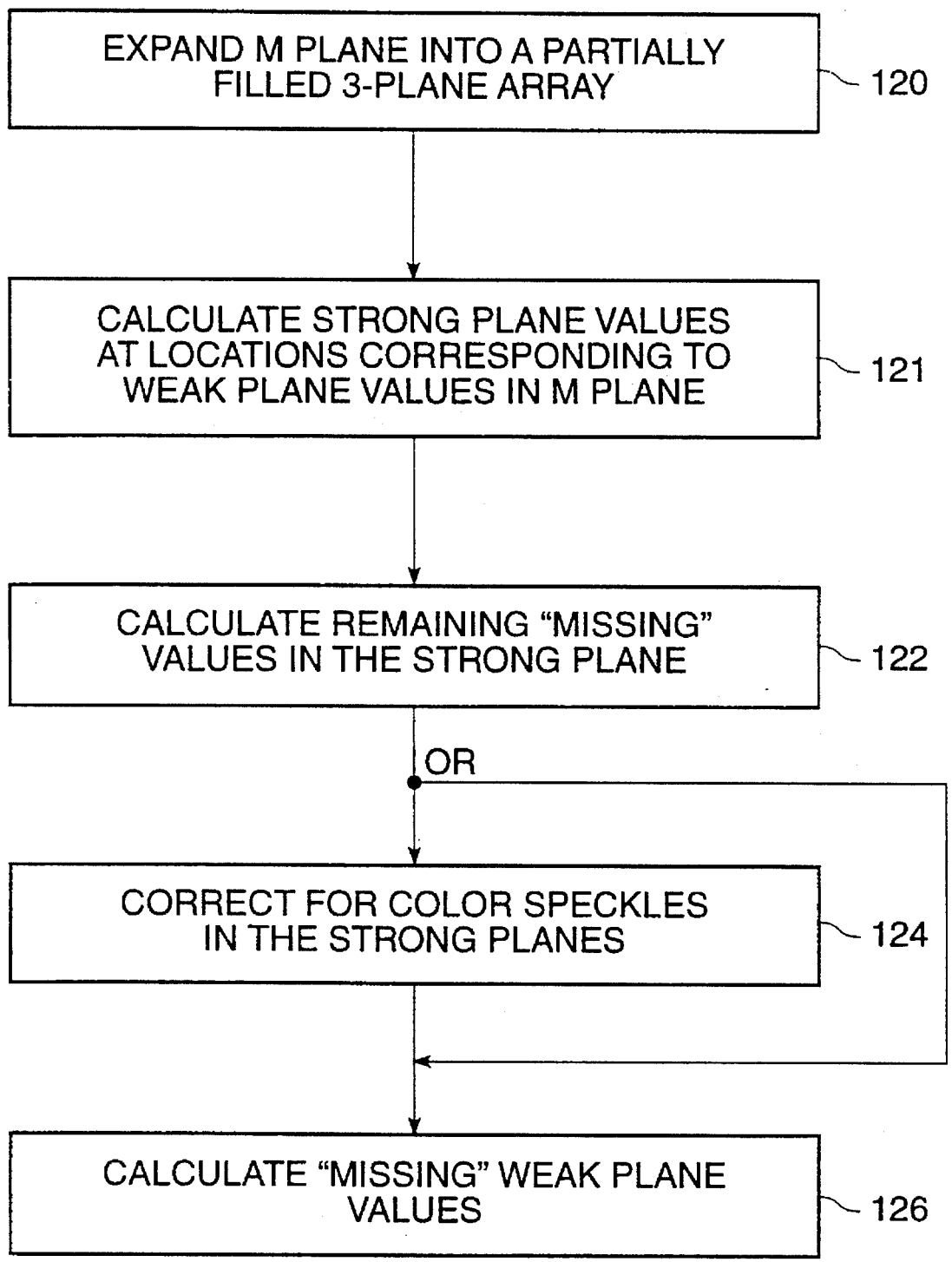
FIG. 6 is a block diagram illustrating the general operation of the demultiplexer of the present invention.

FIG. 6 is a flow chart of the general operation of the image decoding functions of demultiplexer 50. The demultiplexer first expands the M plane into an RGB* three-plane image array (52) which is initially only partially filled (Step 120). This three-plane array is initially only partially filled because the M-plane contains only a subset of the values from each of the three original planes. The demultiplexer then calculates the "missing" strong plane values for the locations corresponding to weak plane values in the multiplexed M plane and fills the corresponding locations (Step 121). The demultiplexer then calculates the remaining missing values in the strong R* and G* planes (Step 122). After filling the strong R* and G* planes with these calculated values, they may contain speckles, bright red or green dots introduced by the decoding process. These speckles may be acceptable in some applications where quick decoding is desired, or they can be corrected at further computational cost. This correction must be made at this stage of decoding since the strong plane values are also used later in weak plane decoding. If speckle correction is desired, demultiplexer 50 adjusts the computed values, as needed, in the strong R* and G* planes to correct the speckles (Step 124).

After speckle correction or if correction is not desired demultiplexer 50 next calculates the "missing" values for the weak B* plane (Step 126). The weak B* plane, as described above, only contains values in 1 or 2 out of every 16 locations. According to the invention, demultiplexer 50 uses values in both the R* and G* planes to approximate the missing weak B* plane values.

Figure 7A:
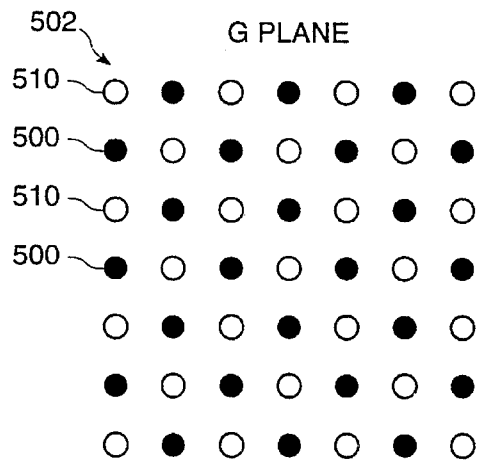
FIGS. 7A, 7B, 7C, 7D, 7E, and 7F are diagrams of the separable reconstructed demultiplexed planes according to two embodiments of the invention.
Figure 7B:
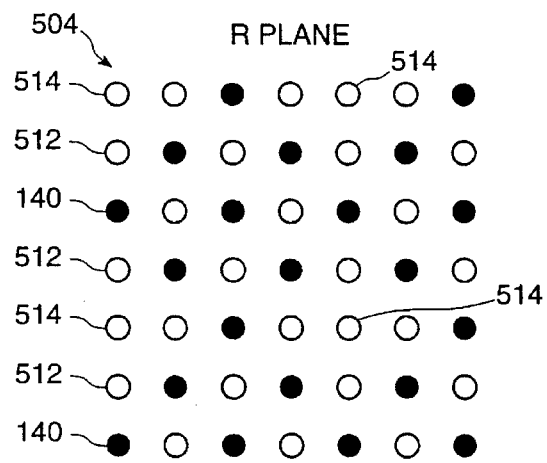
Figure 7C:
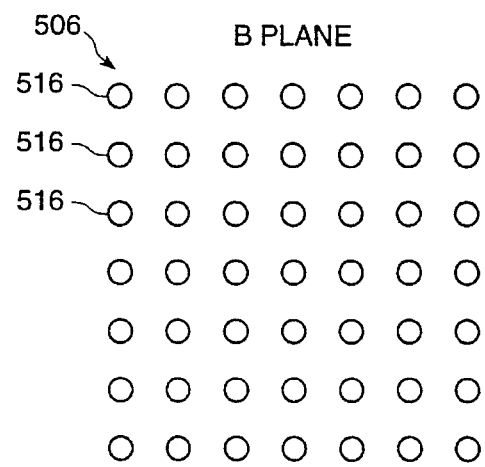

FIGS. 7A, 7B, and 7C illustrate the contents of the separable R*, G*, B* planes 502, 504, 506 from RGB* plane 52 after demultiplexing according to one embodiment of the invention that stores an average weak plane value in 1 out of every 16 pixels in the M plane. It will be seen that, after demultiplexing, each of the strong planes 502, 504 is filled, with half the pixels in G plane (FIG. 7A) holding original sampled $g_s$ values 500 from the original RGB representation of the image and the remaining half of the pixels holding computed $g_c$ values 510 computed by demultiplexer 50. In the R* plane (FIG. 7B), somewhat less than half the pixels hold original $r_s$ values 140 and somewhat more than half are values $r_c$ 512 and $r_{sc}$ 514 computed by demultiplexer 50. Two different labels are used for the computed r values, because demultiplexer 50 computes the $r_{sc}$ values, which are at pixel locations which held a b value in the M plane, in a different way than it computes the remaining $r_c$ and the $g_c$ values. In the B* plane (FIG. 7C), all the values 516 are in fact computed according to the embodiment of the invention that transmits an average value $b_a$ in the M plane, because no sampled b values are available at demultiplexer 50.

Figure 7D:
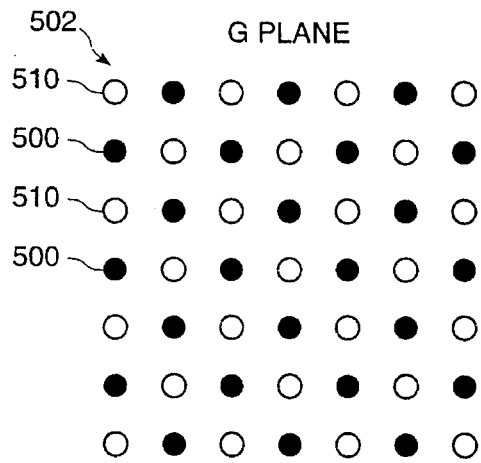
Figure 7E:
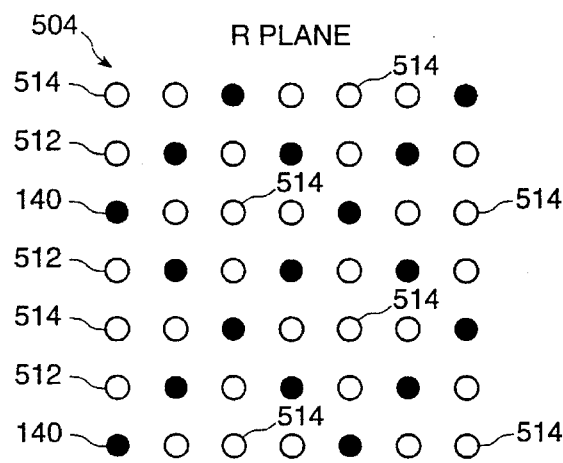
Figure 7F:
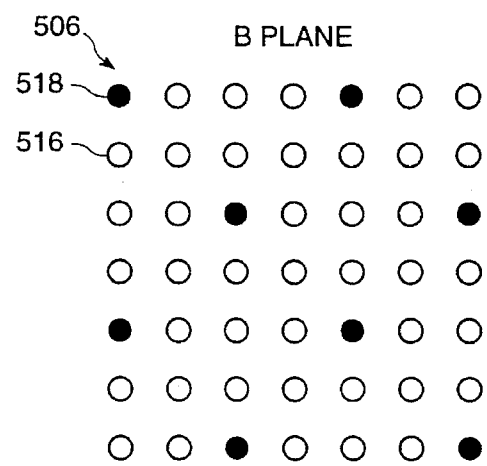

FIGS. 7D, 7E and 7F illustrate the contents of the R*, G*, B* plane 52 after demultiplexing into separable reconstructed planes 502, 504, 506 according to the embodiment of the invention that stores sampled weak plane values in 2 out of every 16 pixels in the M plane. As in the embodiment just described, half the pixels in G* plane 504 (FIG. 7D) hold original $g_s$ values 500 from the original RGB representation of the image and the remaining half hold computed $g_c$ values 510 computed by demultiplexer 50. In the R* plane (FIG. 7E), 6 out of every 16 pixels hold original $r_s$ values 140 and 10 out of every 16 pixels hold $r_c$ and $r_{sc}$ values 512, and 514 computed by demultiplexer 50. In B* plane (FIG. 7F), 2 out of every 16 pixels hold sampled $b_s$ values 518 and 14 out of every 16 pixels hold values 516 computed by demultiplexer 50.

A more detailed description of the strong and weak plane decoding follows.

Correlated Decoding of Strong Planes

Figure 8A:
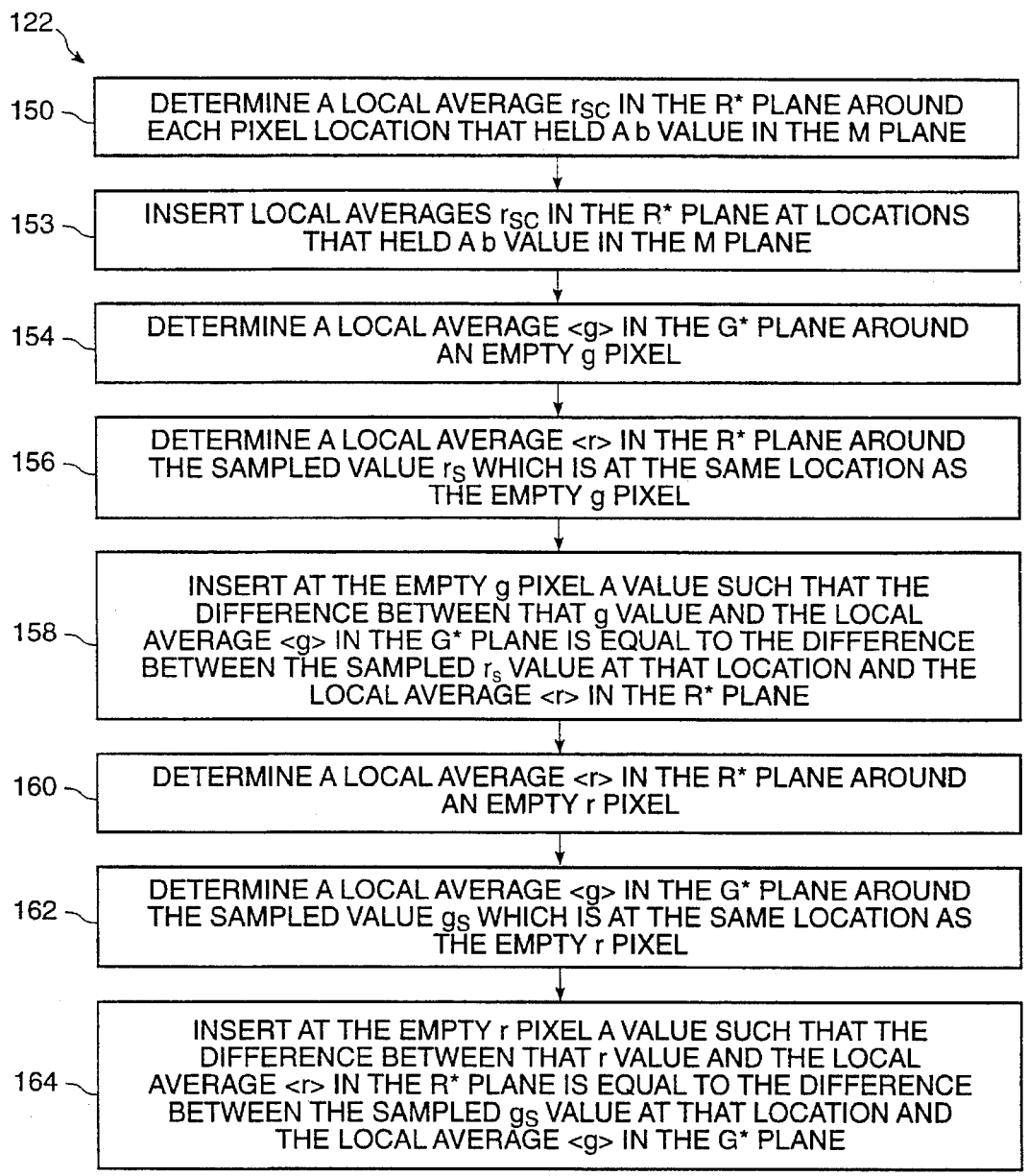
FIG. 8A is a block diagram illustrating the strong plane decoding operation of the demultiplexer of the present invention.

FIG. 8A is a flow chart of the operation of the strong plane image decoding functions (Step 122) of demultiplexer 50 according to one embodiment of the invention. After expansion of the M plane into a 3-plane RGB* image array, demultiplexer 50 first approximates those $r_{sc}$ pixel values in the R* plane which are at locations that in the M plane held a blue value. This is a non-correlated decoding and is done with reference to sampled $r_s$ values only. For each pixel in the R* plane that held a b value, demultiplexer 50 computes a value $r_{sc}$ according to either one of two methods outlined in FIG. 8B (Step 150), and stores that value in the R* plane at the $r_{sc}$ location (Step 153). Computation of $r_{sc}$ values is done first so that the incomplete R* and G* planes will be spatially complementary in order to make the correlated decoding of those two planes easier. The non-correlated-decoded $r_{sc}$ pixel values are treated as sampled $r_s$ pixels for the rest of the decoding.

Once the decoding of the $r_{sc}$ pixels is complete, the R* and G* planes have the following characteristics. Every other pixel location in each plane contains a sampled value for that plane ($r_s$ (including the $r_{sc}$ values) or $g_s$) and the remaining half of each plane is empty. The planes are related in that wherever there is a sampled $r_s$ value in the R* plane, there is no sample in the G* plane; correspondingly where there is a sampled $g_s$ value in the G* plane, there is no sample in the R* plane. Demultiplexer 50 reconstructs the missing pixel values in each plane according to the invention by determining a computed red or green pixel value ($r_c$ or $g_c$) at each empty location.

To compute a missing g value, demultiplexer 50 first determines a local average <g> in the G* plane by averaging the four sampled $g_s$ values nearest to the missing g value (Step 154). Demultiplexer 50 next computes a local average <r> in the R* plane by averaging the four sampled $r_s$ values nearest to the missing g value (Step 156).

Demultiplexer 50 then determines the difference between the local average <r> and the sampled $r_s$ at the location of the missing g value by subtracting the local average <r> from the sampled $r_s$ value. Finally, demultiplexer 50 computes a $g_c$ value such that the difference between that computed $g_c$ and the local average <g> is equal to the difference between the sampled $r_s$ and the local average <r>. Demultiplexer 50 then places the computed $g_c$ value into the G* plane (Step 158).

The operation of demultiplexer 50 just described can also be represented by the equation:

$$g_c = k_1 r_s - k_2 <r> + k_3 <g>,$$

where the k values are constants.

Satisfactory performance is achievable when the constant values are equal to unity, although other constant values may be employed in specific systems.

Missing values in the R* plane are reconstructed with a corresponding equation (Steps 160, 162, 164). These equations are based on the assumption that local spatial second derivatives in different spectral planes are correlated.

Figure 8B:
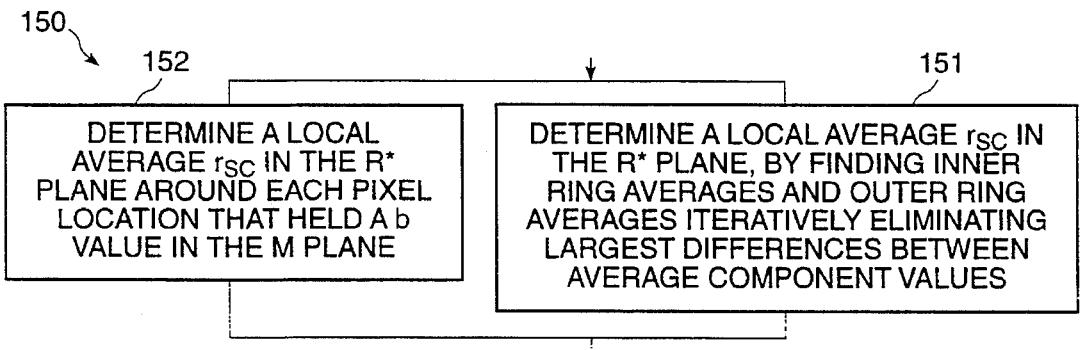
FIG. 8B is a block diagram illustrating how the red plane is filled in with $r_{sc}$ values at pixel locations containing a blue sample.

FIG. 8B is a flow chart of alternative methods of computing $r_{sc}$ from the sampled $r_s$ values for the pixels in the R* plane that held a b value in the M plane. In one alternative, demultiplexer 51) decodes these values by an iterative method of averaging, weighting and adjusting over two sets of neighbors, an inner ring and an adjacent outer ring. This is done as follows: the demultiplexer 50 first computes an average of the four closest sampled $r_s$ values (the inner ting) and an average of the four next closest sampled $r_s$ values (the outer ring). Then the inner ring average is compared with each of the individual values of the inner ;ring, and the value that yields the largest difference is eliminated. This averaging and comparing process is then repeated for the three remaining inner ring values to eliminate the next value that yields the largest difference. The averaging and comparing processes are performed on the outer ring to eliminate values that yield the largest difference from the average of four and the largest difference from the average of the remaining three, finally obtaining the average of two of the inner ring and the average of two of the outer ting. The "inner" difference or difference between the average of two on the inner ring and the average of four on the inner ring is then obtained, and then the "outer" difference or difference between the average of two on the outer ring and the average of four on the outer ring is obtained. The inner difference is then compared with the outer difference to determine the smaller average difference. The value of the center pixel is then selected to be the two-point average (inner or outer ting) corresponding to the ring of smaller average difference obtained above (Step 151).

In another alternative, the $r_{sc}$ value may be computed as an average over its four closest neighbors in the same plane (Step 152). This method has the advantage of requiring less computation, and produces better results for a wider range of images, whereas the preceding method may be better for images with properties such as high contrast single pixel lines or text.

Correlated Decoding of Blue From Average Blue

Figure 9A:
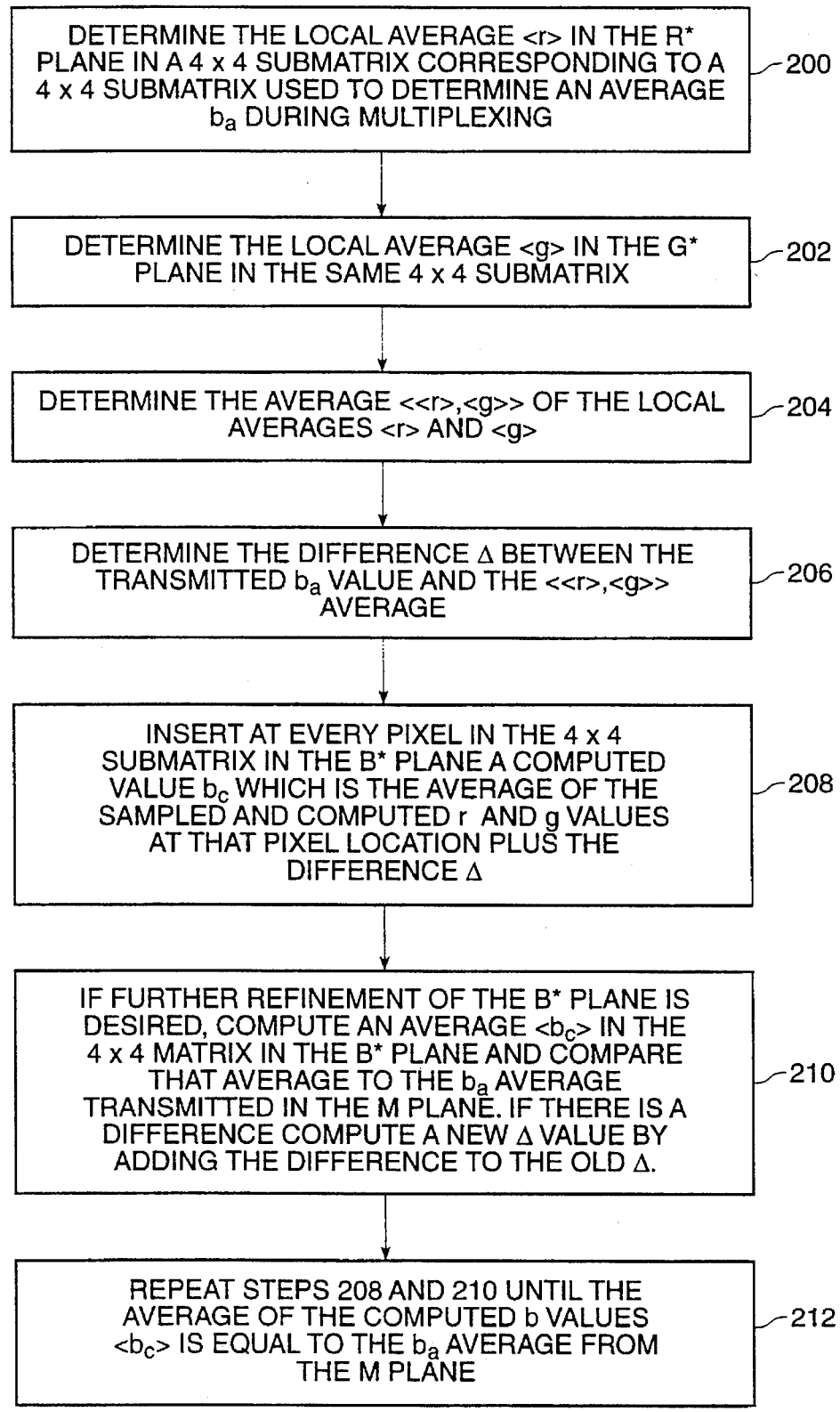
FIG. 9A is a block diagram illustrating the weak plane decoding operation of the demultiplexer of the present invention when the weak plane is multiplexed as average values.

FIG. 9A is a flow chart of the operation of the weak (blue) plane image decoding functions (Step 124) of demultiplexer 50 according to an embodiment of the invention where the b values in the M plane are the average of the blue pixel values over a 4×4 submatrix B plane from the RGB source image.

After the decoding of $r_c$ and $g_c$ values, the R* and G* planes have the following characteristics: every other pixel location in each plane contains a sampled value for that plane, and the remaining half of each plane contains a computed value for that plane. The planes are related in that wherever there is a sampled R value in the R* plane, there is a computed value sample in the G* plane; correspondingly, wherever there is a sampled value in the G* plane, there is a computed value in the R* plane. Demultiplexer 50 uses an approach to decode blue similar to that for correlated decoding of red and green by assuming that blue is correlated with the local red-green average. Demultiplexer 50 uses the sampled and decoded values in the R* and G* planes in the image array along with the $b_a$ values from the M plane to reconstruct missing blue values. This method yields superior image quality.

At this point, demultiplexer 50 determines a local average <r> in the R* plane in a 4×4 submatrix corresponding to the 4×4 submatrix (such as 125) used to determine an average $b_a$ during multiplexing (Step 200) and determines a local average <g> in the G* plane in the same 4×4 submatrix (Step 202). Both of these local averages are simple averages and are computed by adding, for example, the sixteen sampled and computed values in each plane and dividing by sixteen. Demultiplexer 50 then averages these two averages to obtain an average <<r>, <g>> of the local averages <r> and <g> (Step 204). Demultiplexer 50 next computes a difference Δ between the transmitted $b_a$ value and the <<r>, <g>> average (e.g., by subtracting the two values) (Step 206). This difference a is used by demultiplexer 50 to compute a blue value $b_c$ for each of the, for example, sixteen pixels in the B* plane in the 4×4 submatrix. Demultiplexer 50 computes $b_c$ at a location by averaging the sampled and computed $r_s$, $g_c$ or $g_s$, $r_c$ values at that location and adding difference Δ. Finally, it inserts a computed $b_c$ into each location in the B* plane (Step 208).

In those applications where a new M plane must be repeatedly computed for a number of multiplexing/demultiplexing cycles, it is sometimes important that the compression and decompression steps be exactly repeatable on the same image without adding an increasing distortion each time. However, in blue decoding based on a transmitted b average for each 4×4 block, the average of the computed b values <$b_c$> may be different from the transmitted average $b_a$. This will generally occur when there is saturation at any computed blue, i.e., whenever a $b_c$ value falls outside the range 0 to 255 in a system that stores 8-bits per pixel in each plane. If an application requires that compression and decompression be exactly repeatable, further refinement of the B* plane is desired. Demultiplexer 50 accomplishes this by computing an average $<b_c>$ in the 4×4 matrix in the B* plane and comparing that average to the $b_a$ average transmitted in the M plane. If there is a difference demultiplexer 50 computes a new Δ value by adding the difference to the old Δ value and then recalculates the $b_c$ values in the submatrix (Step 210). These steps are repeated until the average of the computed b values $<b_c>$ is equal to the $b_a$ average from the M plane, which usually happens by the second or third iteration (Step 212).

Correlated Decoding of Blue From Sampled Blue Values

When the blue values in the M plane are not $b_a$ values computed from the average of a number of blue values in the original RGB image, but are instead sampled $b_s$ values from two locations within every 4×4 matrix, the decoding scheme just described does not generally produce as good results. If better quality is necessary, an alternative method of blue decoding must be used. In one alternative method, the submatrix over which the correlated decoding of blue takes place is expanded from a 4×4 submatrix to a 12×12 submatrix centered on the 4×4 submatrix for which the $b_c$ values are being computed.

Figure 9B:
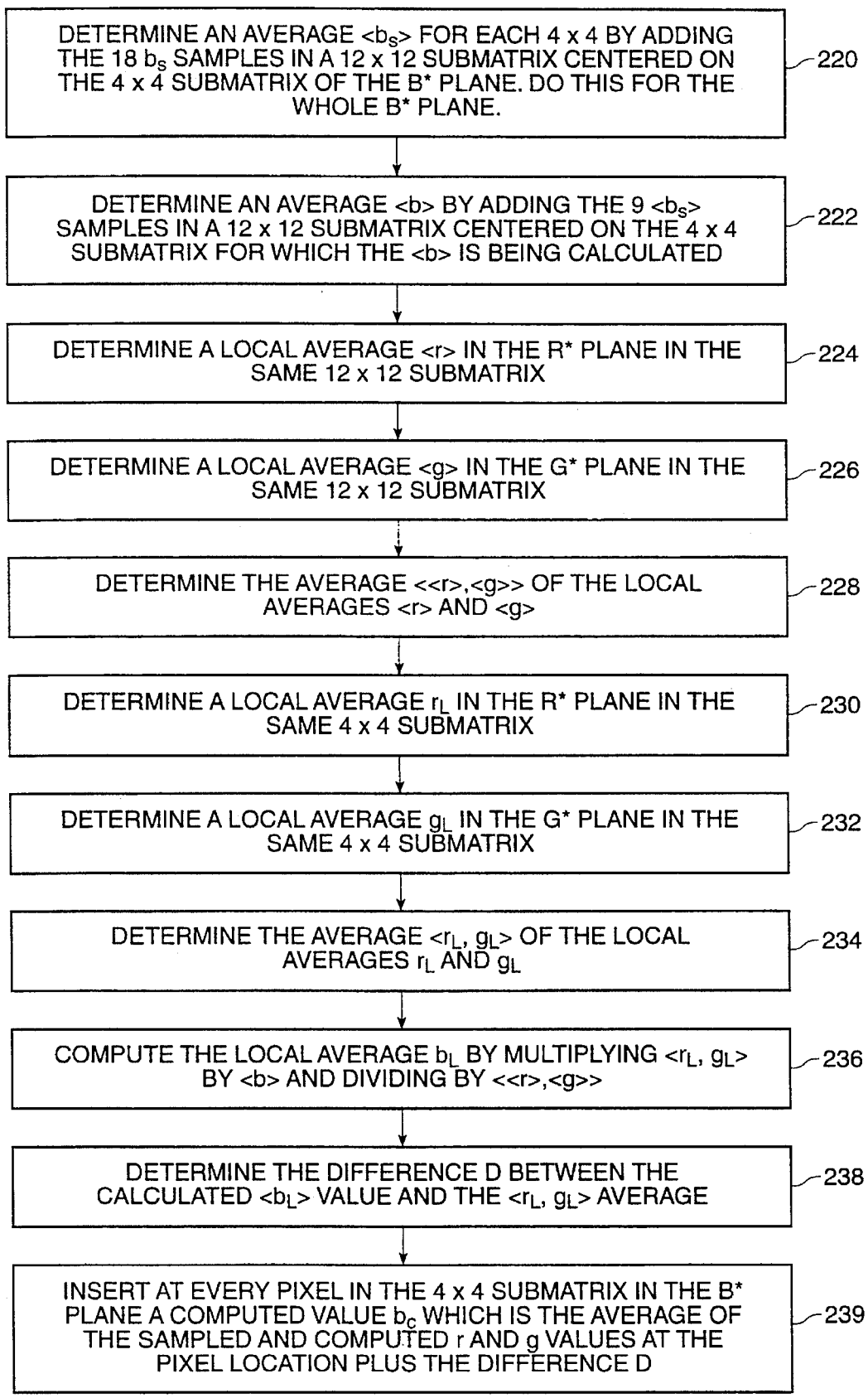
FIG. 9B is a block diagram illustrating the weak plane decoding operation of the demultiplexer of the present invention when the weak plane is multiplexed from sampled values.

FIG. 9B is a flow chart of the weak (blue) plane image decoding functions (Step 124) of demultiplexer 50 according to the embodiment of the invention where the b values of the M plane are sampled blue values. Demultiplexer 50 first determines an average $<b_s>$ of the 18 blue samples within a 12×12 neighborhood centered on each 4×4 submatrix for the entire image (Step 220). Thus, each 4×4 submatrix has a $<b_s>$ obtained by this step. Demultiplexer 50 then determines an average $<b>$ of the 9 $<b_s>$ values within the 12×12 neighborhood centered on the 4×4 submatrix for which a $b_c$ value is being determined (Step 222). Then demultiplexer 50 calculates a local average $<r>$ in the R* plane in the same 12×12 neighborhood (Step 224) and determines a local average $<g>$ in the G* plane in the same 12×12 neighborhood (Step 226). Both of these local averages are simple averages; they are computed by adding the one hundred and forty four sampled and computed values in each plane and dividing by 144. Demultiplexer 50 then averages these two averages to obtain an average $<<r>, <g>>$ of the local averages $<r>$ and $<g>$ (Step 228). Demultiplexer 50 then calculates a local average $r_L$ in the R* plane in the center 4×4 (Step 230) and determines a local average $g_L$ in the G* plane in the same 4×4 (Step 232). Both of these local averages are simple averages; they are computed by adding the sixteen sampled and computed values in each plane and dividing by 16. Demultiplexer 50 then averages these two averages to obtain an average $<r_L,g_L>$ of the local averages $r_L$ and $g_L$ (Step 234). Demultiplexer 50 then computes a local average $b_L$ by multiplying $<r_L,g_L>$ by $<b>$ and dividing by $<<r>, <g>>$ (Step 236). Next demultiplexer 50 computes a difference D between $b_L$ and $<r_L,g_L>$ by subtracting the two values (Step 238). This value D is used by demultiplexer 50 to compute a blue value $b_c$ for each of the fourteen pixels in the B* plane in the 4×4 submatrix that does not contain one of the two original $b_s$ values. Demultiplexer 50 computes $b_c$ at each pixel by averaging the sampled and computed r and g values at that location and adding D; finally it inserts the computed $b_c$ into each empty location in the B* plane (Step 239).

The blue decoding from sampled blue operation of demultiplexer 50 can also be described by the equation:

$$b_c = <r_p,g_p> + [(<r_L,g_L> \times <b>)/<r,g>] - <r_L,g_L>.$$

where: $b_c$ is the computed blue value at each pixel, $<r_p,g_p> = (r_p+g_p)/2$ is the average of the red and green values at that pixel, $<r_L,g_L>$ is the local average of red and green in the center 4×4 portion of a 12×12 submatrix, $<b>$ is the computed local blue average in the 12×12 submatrix, and $<r,g>$ is the local average of red and green in the same 12×12 submatrix.

The relationships among the variables in the above equation may vary by constants, although satisfactory results are achievable where the constants are equal to unity, as is implied in the above equation.

The neighborhood that has provided good performance is a 12×12 pixel neighborhood centered on the 4×4 pixel block containing the b pixel whose value is being computed. By this scheme the RGB decoder achieves results similar to that from average-encoding. If the decoding scheme of FIG. 9A were used in the case of sample-encoding, blue and yellow "smudges" or blurred regions could occur due to the lower sampling rate of the weak plane. Expanding the neighborhood used to estimate the local weak plane average to 12×12 pixels virtually eliminates these "smudges", although a slight loss of blue saturation in high spatial frequency areas occurs (i.e., fine detail), which is hardly perceptible in any of the images tested.

Weak plane average-encoding generally decodes with superior image quality compared to weak plane sample-encoding. If a full RGB image is available to the multiplexer, weak plane average encoding is therefore preferable. On the other hand, weak plane sample-encoding is appropriate if no computation at the multiplexer is desired, or if the M plane is captured directly by an input device such as a CCD camera with a mosaic color filter, where weak plane average-encoding is not possible.

Speckle Correction

Up to this point in the decoding process, a flaw in the perceived image quality is the presence of red and green speckles which can occur in the decoded image at certain locations. A speckle is a disparate (too high or too low) value in the computed strong red or green planes. In the decoded image, speckles may be seen as bright red or bright green dots at high contrast edges or along high contrast lines. Because of the special handling of the blue plane, as described above, blue speckles do not occur in the final image. After the decoding of R* and G*, and before B* plane decoding, additional operations can be performed to improve the quality of the decoded image by removing these speckles. Within each of the decoded R* and G* planes there are two different categories of pixel values, namely, sampled and computed. A sampled value in the R* plane corresponds with a computed value at the same pixel location in the G* plane, and vice versa. The further refining operations discussed below are aimed at improving the computed values in each strong plane.

In order to correct speckles, demultiplexer 50 first uses a process herein called "chromatic smoothing" to calculate an adjusted multiplexed $M_a$ plane. After construction of this $M_a$ plane, demultiplexer 50 then tests a threshold condition at every pixel containing computed red $r_c$ or green $g_c$ values. If the threshold condition is exceeded at any pixel, the $M_a$ plane is used to determine a correction value β, which is added to the computed value needing correction. The details of these operations will now be explained.

Chromatic Smoothing

Figure 10A:
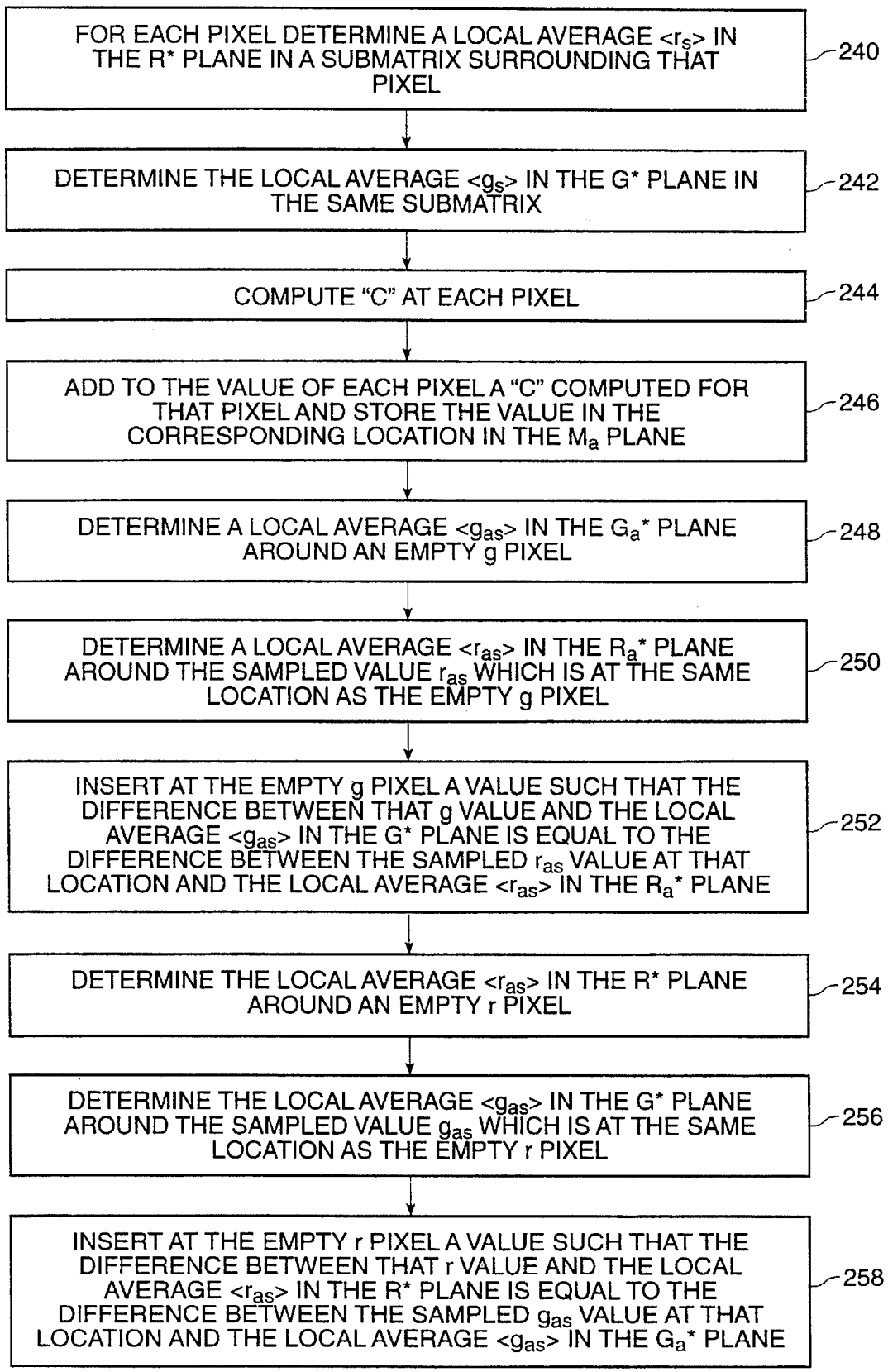
FIG. 10A is a block diagram illustrating the chromatic smoothing operation of the demultiplexer according to the present invention.

If a correction is needed for a computed value, demultiplexer 50 determines the amount of correction needed by a process called chromatic smoothing. FIG. 10A is a flow chart of the chromatic smoothing operation of the speckle correcting functions of demultiplexer 50 according to one embodiment of the invention.

For chromatic smoothing, demultiplexer 50 uses the half-empty complementary R* and G* planes which result after the calculation of the missing $r_{sc}$ values in the R* plane at pixel positions that hold b values in the M plane (Step 153 of FIG. 8A). Demultiplexer 50 constructs a new $M_a$ plane for use in the chromatic smoothing process by, at each pixel, first computing an average $<r_s>$ of the sampled r values in a neighborhood of a pixel (Step 240) and an average $<g_s>$ of the sampled g values in the same neighborhood of the same pixel (Step 242). Good results were obtained in experimental testing with a neighborhood size of 9×9 pixels centered on the pixel whose value is being adjusted. Demultiplexer 50 next computes a value C, depending on which plane (R* or G*) from which the current sample was taken, according to the equations:
for sample taken from R*:

$$C=[(<r_s>+<g_s>)/2]-<r_s>;$$

for sample taken from G*:

$$C=[(<r_s>+<g_s>)/2]-<g_s>; \quad \text{(Step 244)}.$$

Demultiplexer 50 next adds the value of the same pixel and C and stores the result in the corresponding location in the $M_a$ plane (Step 246). These steps are repeated for every sampled $r_s$ and $g_s$ value in the R* and G* planes. This chromatic smoothing process could be performed with a multiplicative process, similar to that described in connection with FIG. 12A for entropy reduction, but it is less effective than the described additive method.

At this point in the decoding, the $M_a$ plane is half filled with adjusted sampled $r_{as}$ values and half filled with adjusted sampled $g_{as}$ values. Next, demultiplexer 50 decodes the $M_a$ plane into $R_a^*$ and $G_a^*$ planes using exactly the same procedure (outlined in steps 154 to 164) that was used to compute the values $r_c$ and $g_c$ from the original M plane (Steps 248 to 258). At this point, the $R_a^*$ plane is half filled with adjusted sampled $r_{as}$ values and half filled with adjusted computed $r_{ac}$ values and the $G_a^*$ plane is half filled with adjusted sampled $g_{as}$ values and half filled with adjusted computed $g_{ac}$ values.

Speckle Correction Threshold Condition

Once the $R_a^*$ and $G_a^*$ planes are complete, demultiplexer 50 tests every computed $r_c$ and $g_c$ value in the original R* and G* plane to see if a speckle correction is needed and adjusts those values where a correction is needed. A speckle is a disparate value in the computed $r_c$ or $g_c$ values in the R* or G* planes. Demultiplexer 50 compares the computed and sampled values for r and g at each pixel location to see if these values differ by more than a threshold value computed as described below.

Figure 10B:
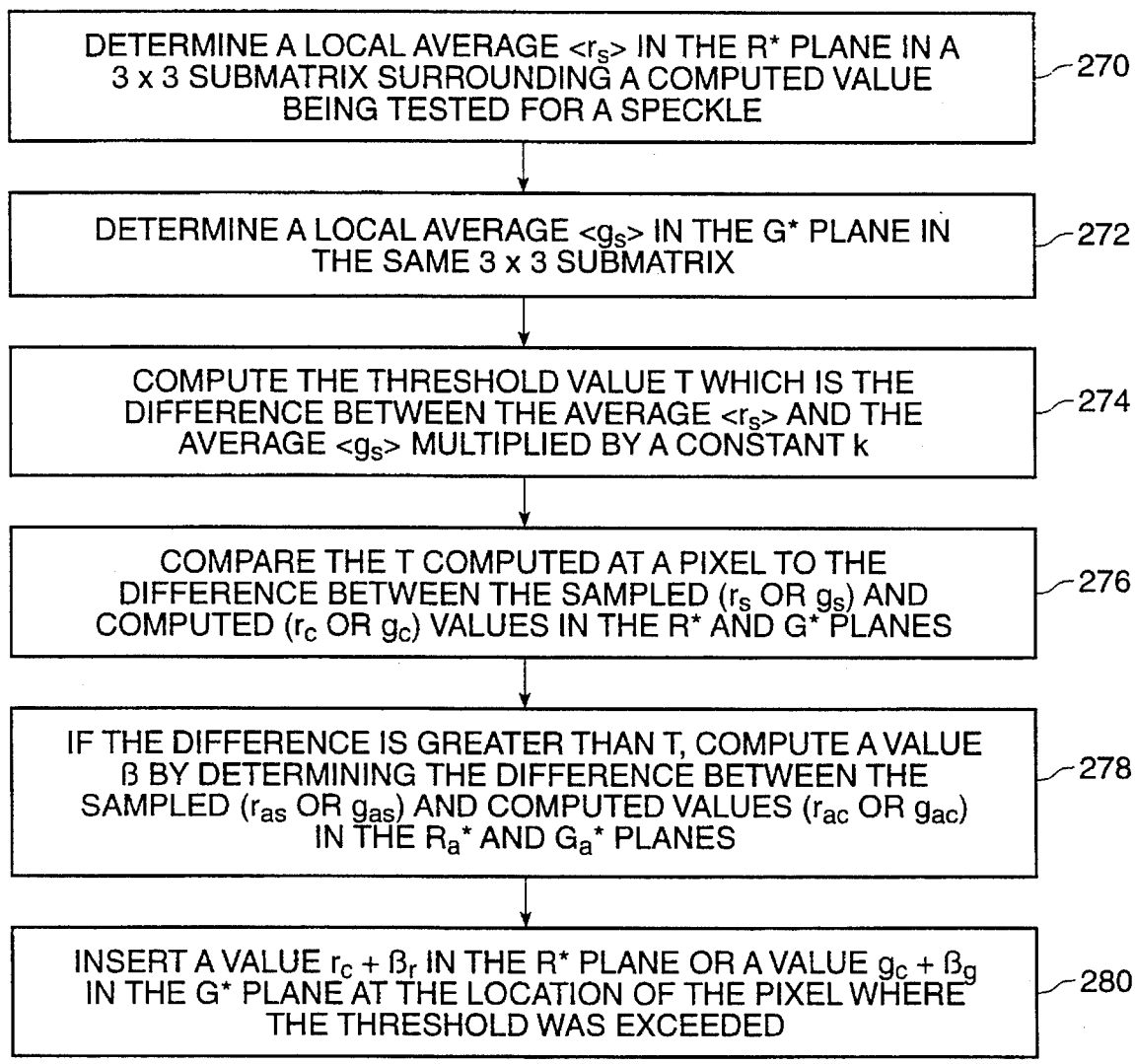
FIG. 10B is a block diagram illustrating the speckle correction threshold testing and adjustment operation of the demultiplexer according to the present invention.

FIG. 10B is a flow chart of the threshold testing and adjustment functions of demultiplexer 50. For every pixel, demultiplexer 50 computes a threshold value T by first computing the average $<r_s>$ of the sampled $r_s$ values in a 3×3 submatrix centered on the pixel (Step 270) and then computing the average $<g_s>$ of the sampled $g_s$ values in the same submatrix (Step 272). Demultiplexer 50 then finds the absolute difference between these two averages and multiplies them by a constant k to get T (Step 274). This computation can be represented by the equation:

$$T=k|<r_s>-<g_s>|.$$

In experimental tests, good results were obtained with a constant k equal to 0.175.

Once T is determined at a pixel, demultiplexer 50 compares T to the difference between the sampled and computed values at that pixel and if the difference is greater than T (Step 276), then demultiplexer 50 will apply a correction to the computed value at that pixel (Steps 278 and 280). For a pixel with a computed value $r_c$ in the R* plane and a sampled value $g_s$ in the G* plane, this comparison can be represented by the expression:

$$\text{If} |r_c - g_s| > T, \text{ then adjust } r_c.$$

The value of the speckle correction β at any pixel that meets the threshold condition is obtained as the difference of the sampled value ($r_{as}$ or $g_{as}$) and the computed value ($r_{ac}$ or $g_{ac}$) at that pixel location in the planes $R_a^*$ and $G_a^*$ (Step 278). For a computed $g_c$ value needing correction, the correction value $β_g$ would be calculated by the equation $β_g=r_{as}-g_{ac}$ and the correction would be made by adding $β_g$ to the value $g_c$ in the G* plane. For a computed $r_c$ value needing correction, the correction value $β_r$ would be calculated by the equation $β_r=g_{as}-r_{ac}$ and the correction would be made by adding $β_r$ to the value $r_c$ in the R* plane. Once the corrected computed value is determined it is inserted into the corresponding location in the R* or G* plane (Step 280).

Spatio-chromatic Multiplexing Plus Entropy Reduction Plus JPEG Compression

The invention as described thus far preserves excellent color image quality after transforming images normally represented as three separable planes of color components into a single spatio-chromatically multiplexed plane, with essentially only one of the three color components being present at any one pixel position, thereby obtaining three to one compression. However, in many applications compression greater than three to one is required.

One advantage of the present invention is that the M plane output of multiplexer 30 is similar to a black and white version of the same image and is therefore well suited to further compression using standard single-plane compression techniques designed for monochromatic images.

The JPEG compression technique performs a spatial frequency compression of a plane of an image as follows. First, the plane is divided into blocks of 8×8 pixels and a discrete cosine transform (DCT) is computed independently for each block. Second, the coefficients of the transformed blocks are weighted in accordance with the number of bits allocated by a Quantization Matrix for each spatial frequency; and third, code-length (Huffman encoding is applied to the quantized coefficients. Decompression follows an inverse procedure.

A standard JPEG compression scheme can be applied directly to the single M plane output of multiplexer 30; however, since the M plane has a high degree of entropy introduced by the multiplexing process the effectiveness of the JPEG compression scheme is diminished. In the context of images, entropy is a general measure of image "bumpiness;" the greater the bumpiness the higher the entropy and the greater the amount of information that must be transmitted. One problem caused by multiplexing is that it adds an artificial component of entropy. To understand how this "bumpiness" comes about, consider a picture composed of just red and green planes. If the red and green planes were each constant across the image, but of different levels, then in principle it would require only two numbers to specify the two (constant) levels. However, the multiplex plane that is derived from such an image would be composed of an interlaced checkerboard of constant red and constant green values, but with the red and green values at different levels. The multiplex image would thus have a strong component at a high spatial frequency, which corresponds to the lower-right corner of the 8×8 output from the JPEG DCT. The blue values would create another component of induced entropy but at lower spatial frequencies.

Prior art systems that attempted to use JPEG image compression with multiplexed color planes concluded that compressing the multiplexed plane directly was not feasible and so transformed the multiplexed plane to a YIQ space before compression. This necessitated additional computation processing at both the receiver and the transmitter. The present invention utilizes a method and apparatus that allow direct JPEG compression of the M plane, i.e., without conversion to a YIQ representation. The design of the M plane according to the present invention can achieve good perceived image quality with JPEG compression, with the total compression in the range of 10:1 to 20:1. With the addition of the entropy reduction technique described below, good perceived image quality is achieved with much higher compression ratios.

Figure 11:
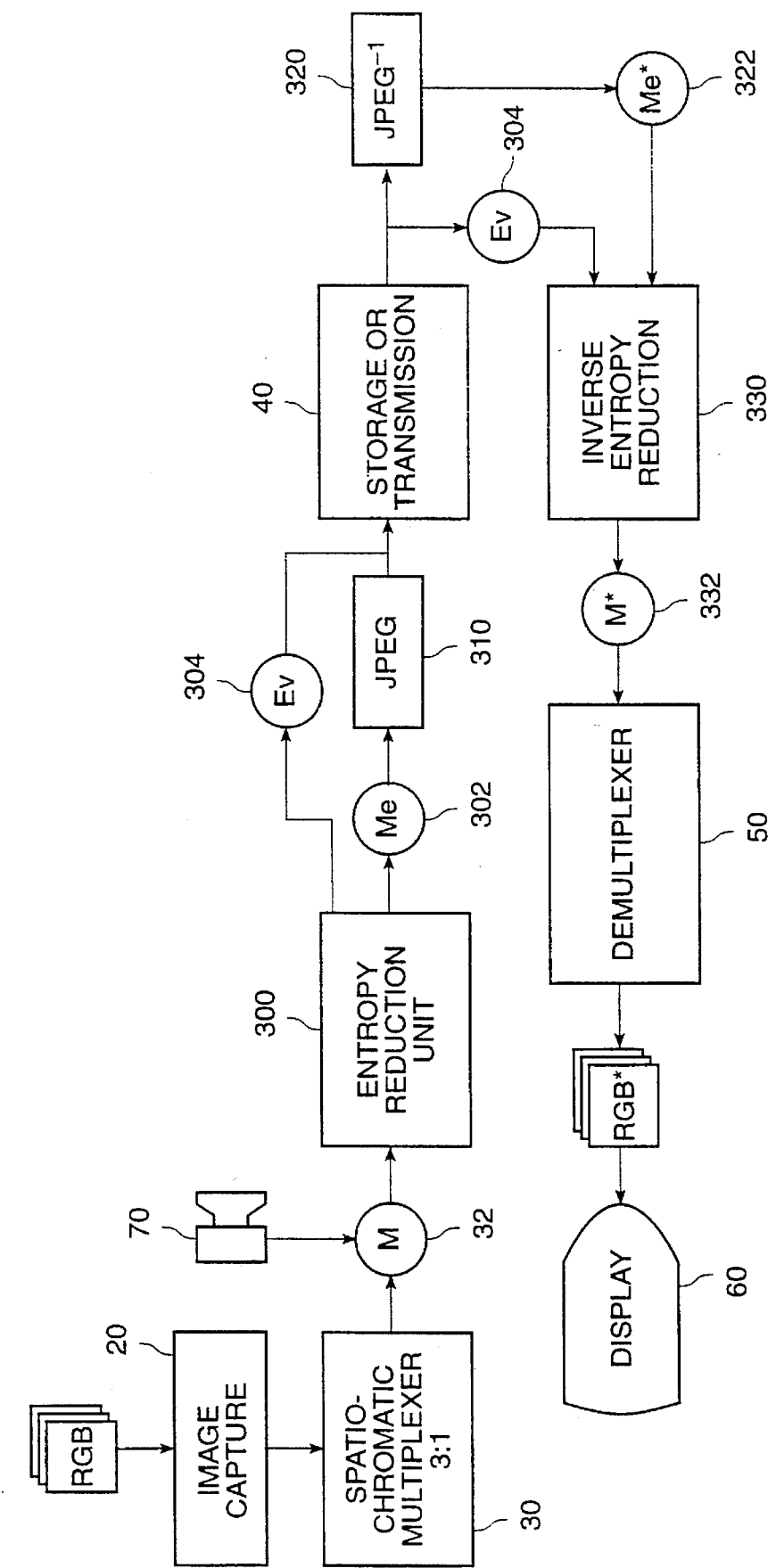
FIG. 11 is a block diagram of a data compression system employing the multiplexing and demultiplexing processes with additional single-plane compression according to the invention, and with the addition of entropy reduction of the multiplexed plane and corresponding entropy restoration before decoding.

FIG. 11 is a block diagram of an embodiment of the invention that incorporates additional elements which facilitate more efficient compression of the M plane before transmitting or storing. Included are an entropy reduction unit 300, a JPEG compression circuit 310, a JPEG decompression circuit 320, and an entropy restoration circuit 330. Entropy reduction unit 300 performs operations on M plane 32 to produce an entropy-reduced $M_e$ plane 302 and to produce entropy adjustment variables ($E_v$) 304. $M_e$ plane 302 is received by the JPEG compression circuit 310 which can be a commercial logic circuit designed to perform single-channel JPEG compression. JPEG circuit 310 produces a compressed data set which is received by means 40 for storage or transmission. Means 40 also receives the $E_v$ variables 304. After storage or transmission, the compressed data set is received by inverse JPEG unit (JPEG$^{-1}$) 320 which decompresses it to create $M_e^*$ plane 322. Inverse entropy reduction unit (ERU$^{-1}$) 330 receives $M_e^*$ plane 322 and the $E_v$ variables 304 and restores the entropy in the $M_e^*$ plane and outputs M* plane 332 which is decoded by demultiplexer 50 as described above.

There are three alternative types of entropy reduction unit (ERU) 300 and inverse entropy reduction unit (ERU$^{-1}$) 330 according to three different embodiments of $\alpha_r = (A/<r>)$ $\alpha_g = (A/<g>)$ $\alpha_b = (A/<b>)$ (Step 404).

ERU 330 then tests each ratio $\alpha_r$, $\alpha_g$, and $\alpha_b$ to determine if it is greater than one (Step 406). For each of the $\alpha$ values;

greater than one, ERU 300 computes a value or $\alpha'$ according to the equations:

$\alpha'_r = ((255-A)/(255-<r>))$ $\alpha'_g = ((255-A)/(255-<g>))$ $\alpha'_b = ((255-A)/(255-<b>))$ (Step 408).

ERU 30 then alters the individual r, g, and b values within the area according to the following equations.

$r' = r\alpha_r$ or $r' = 255-(255-r)\alpha'_r$ $g' = g\alpha_g$ or $g' = 255-(255-g)\alpha'_g$ $b' = b\alpha_b$ or $b' = 255-(255-b)\alpha'_b$ (Step 410)

The equations on the left are used when the corresponding $\alpha$ value is less then one and the equations on the right are used when the $\alpha$ value is greater than one.

ERU 300 computes the appropriate $\alpha$ or $\alpha'$ values noted above and applies the appropriate equations in order to prevent saturation at any pixel location. Saturation would not arise when for example the red image is generally strong compared with the g and b components. In that case, <r> would be large and all r pixels would be multiplied by a ratio (A/<r>)<1. However, if the red image is generally weak, all r pixels would be multiplied by a ratio (A/<r>)>1, which could cause a saturation problem for any large values of r and which can exist even though <r> is relatively small. To prevent such saturation ERU 300 applies the appropriate $\alpha$ values and equations as described above. With this method, there is never a danger of saturation of any pixel values as a result of the entropy reduction scheme. ERU 300 then stores the r', g', and b' values it computed into $M_e$ plane 302 (Step 412) and stores the three average values <r>, <g>, and <b> into a buffer memory (Step 414). After JPEG compression, transmission, and decompression of the $M_e$ plane, and after transmission of the average values, ERU$^{-1}$ 330 uses the <r>, <g>, and <b> values to perform the inverse operation on each pixel in $M_e^*$ plane 322 to reconstruct M* plane 332 (Step 416) which is then decoded by demultiplexer 50.

By this method, ERU 300 achieves a major decrease in spurious entropy in the M-plane image that otherwise would decrease the compression efficiency of JPEG. The processing cost of this method is basically one multiply per pixel at both the transmitter and receiver, and the: transmission of an extra $24/n^2$ bits per pixel (in an 8-bit system) in the transmission channel for transmission of the <r>, <g>, and <b> values. This requires three bytes total per block. Since the cost of three bytes, or 24 bits, per block is spread over $n^2$ pixels, the cost in bits per pixel (bpp) to transmit this entropy correction information is $24/(n^2)$, which converts to 0.24, 0.09, and 0.06 bpp for n=10, 16, and 20, respectively. Not surprisingly, the cost in bits per pixel increases as the block size decreases, but the resulting compression also increases because small block sizes achieve better chromatic flattening. Using these criteria, it has been determined that an optimum block size is on the order of 16×16.

Additional savings can be attained by encoding the coefficient triplets <r>, <g>, and <b> by metres of a DPCM (differential pulse code modulation) scheme which is a lossless procedure based essentially upon the encoding of differences between coefficients of neighbor blocks instead of the coefficients themselves.

Figure 13A:
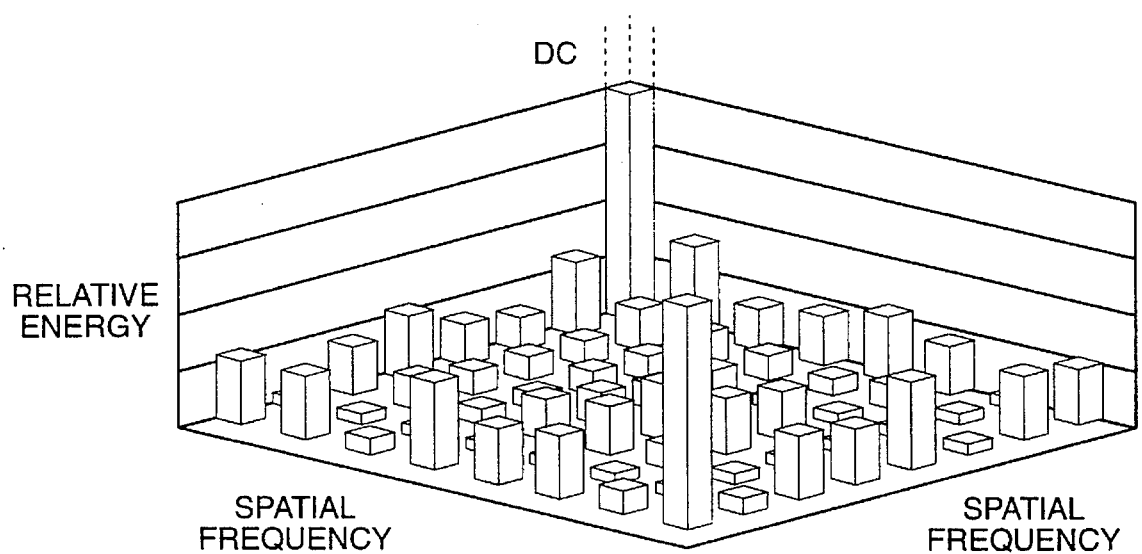
FIGS. 13A and 13B show the effect of entropy reduction on the average discrete cosine transform of the M plane.
Figure 13B:
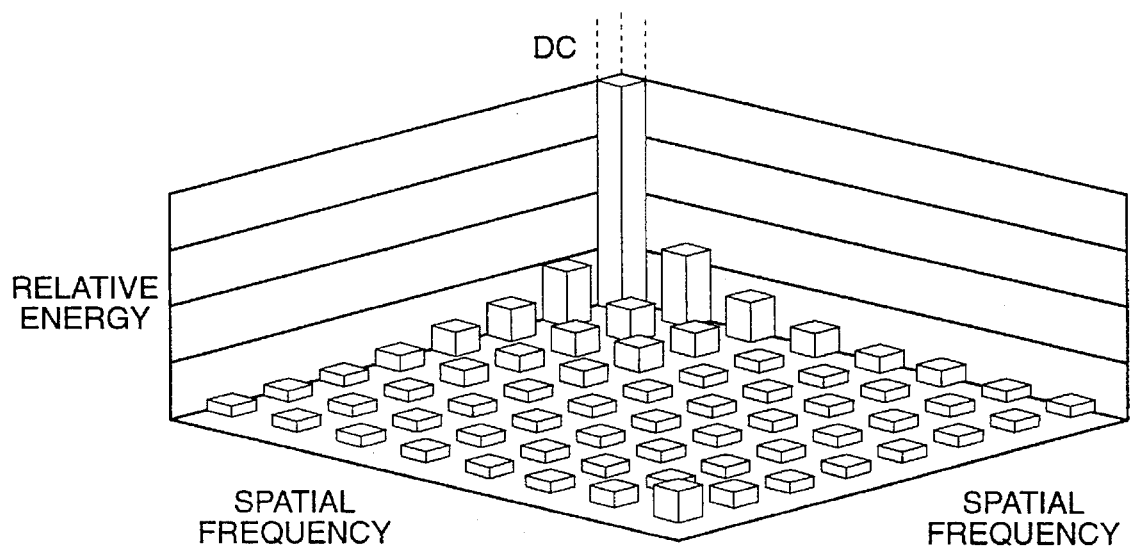

For most images, a major net reduction in the extra entropy component is achieved. For example, FIG. 13A shows the "islands" of entropy-induced energy in the average Discrete Cosine Transform (DCT) of the M plane, which are then "flattened" and pushed towards the DC (zero frequency) corner in the average DCT of the entropy-corrected $M_e$ plane shown in FIG. 13B.

In addition to entropy correction, this multiplicative scheme can have an additional unwanted effect: increased blockiness in the decoded image. This blockiness is more apparent when an M plane is subjected to heavy JPEG compression (e.g., 50:1). This effect results from the fact that multiplicative correction generally reduces the range of intensity variation within each block of an image because the corrective multiplicative factor is always less than unity. Thus, if the original intensity values in an n×n block range from $P_{max}$ to $P_{min}$, then after entropy correction the intensity range in the same block will be reduced to $j*(P_{max}-P_{min})$, where the constant j<1.

Additive Entropy Reduction of The M Plane

The multiplicative entropy-correction scheme noted above is extremely effective in reducing entropy, but at the cost of one multiply-per-pixel at both the transmitter and receiver. An additive correction scheme is as effective except for the saturation problem noted above which in the multiplicative scheme was solved by reversing the direction of correction when there is a potential problem. Unfortunately, there is no equivalent fix in an additive scheme. Nevertheless, an additive correction scheme works well for most images and is significantly less costly in computation, requiring only one addition instead of one multiplication per pixel. Another advantage of additive entropy correction, apart from simpler computation, is that it does not affect the range of pixel values and therefore does not cause the increase in blockiness noted in connection with multiplicative correction. Therefore, additive entropy correction may be particularly useful in connection with heavy JPEG compression.

Figure 12A:
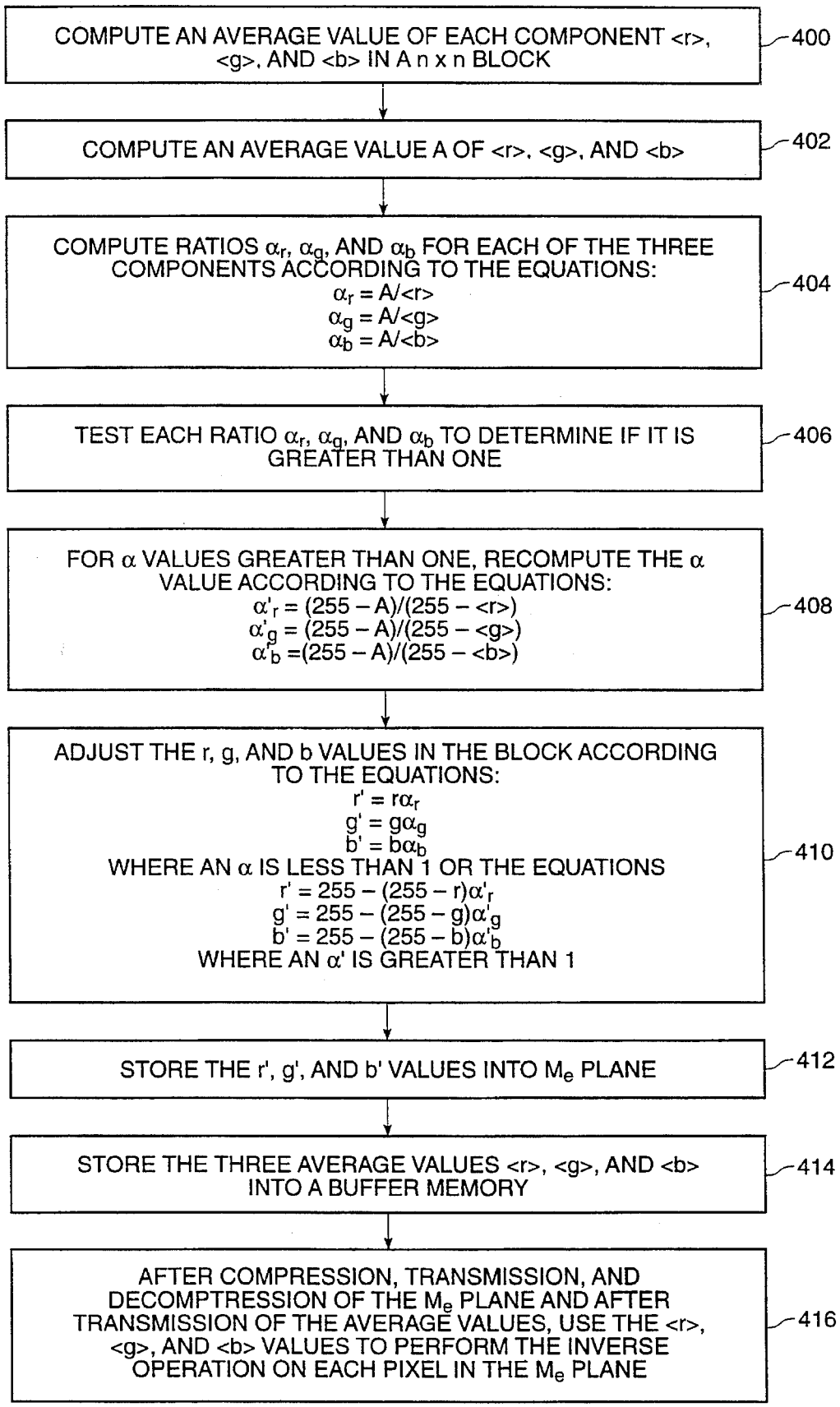
FIG. 12A is a block diagram of the operation of the entropy reduction unit and inverse entropy reduction unit according to the embodiment of the invention that uses multiplicative entropy reduction.
Figure 12B:
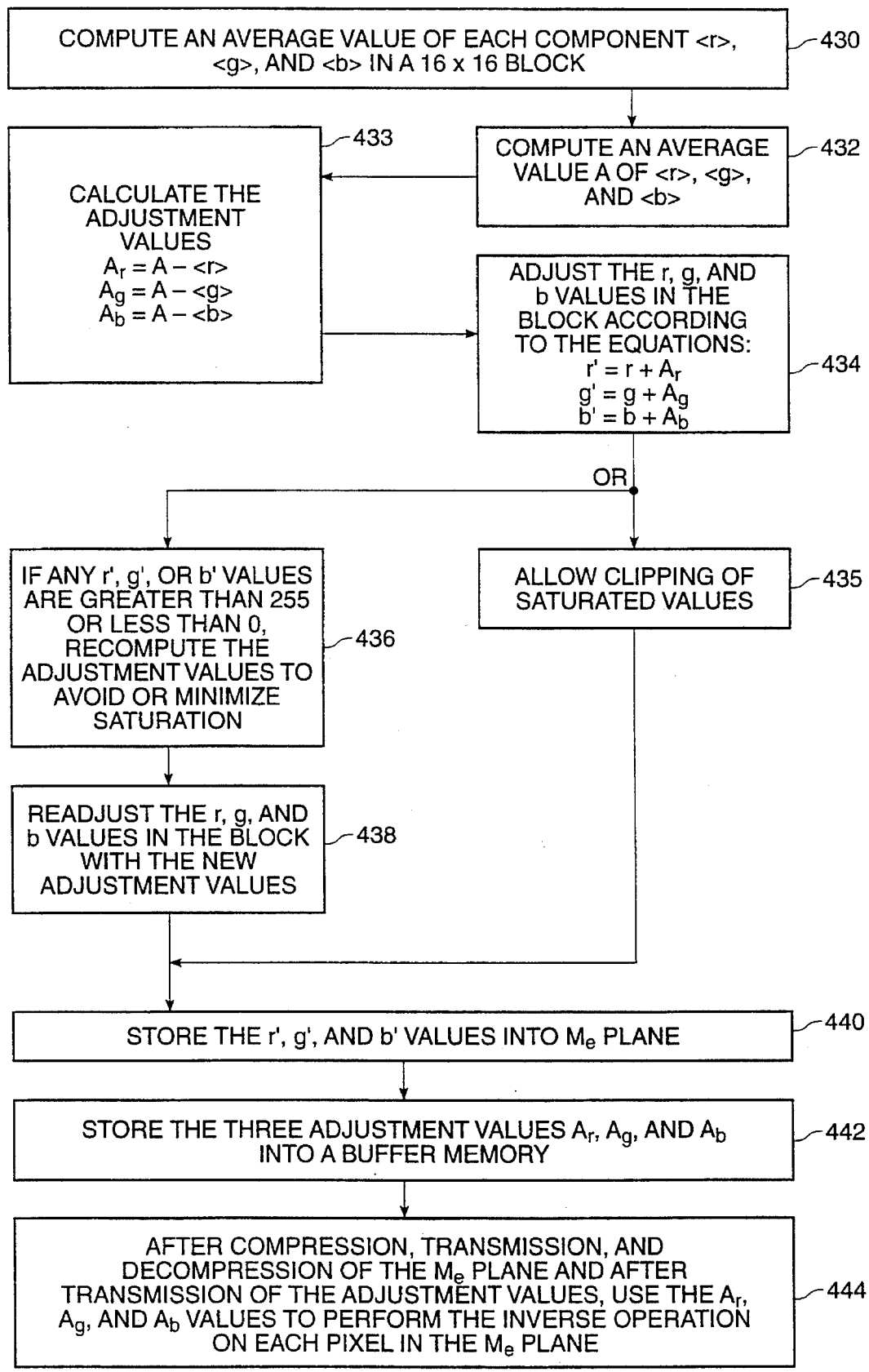
FIG. 12B is a block diagram of the operation of the entropy reduction unit and inverse entropy reduction unit according to the embodiment of the invention that uses additive entropy reduction.

FIG. 12B is a flow chart of the general operation of entropy reduction unit (ERU) 300 and inverse entropy reduction unit (ERU$^{-1}$) 330 according to the embodiment of the invention that uses additive entropy reduction. ERU 300 first computes average values <r>, <g>, and <b> within each n×n component over this area (Step 430) and then computes a target value A which, for example, will minimize the possible saturation in all three primaries., This can be accomplished by calculating the maximum, $P_{max}$, and minimum, $P_{min}$, brightness values in the n×n submatrix of the M plane. Next, the maximum, $A_{max}$, and minimum, $A_{min}$, averages from the values <r>, <g>, and <b> are calculate. The target value A is calculated using the equation:

$$A=(A_{max}+A_{min}+255-P_{max}-P_{min})/2 \quad \text{(Step 433)}.$$

ERU 300 next calculates the adjustment values for each plane:

$$A_r=A-<r>$$

$$A_g=A-<g>$$

$$A_b=A-<b>$$

ERU 300 then uses the equations:

$$r'=r+A_r$$

$$g'=g+A_g$$

$$b'=b+A_b$$

to convert the r, g, and b pixel values to entropy-reduced values (Step 434).

Except for the potential saturation problem, this form of correction works even better than multiplicative correction and indeed when <r>, <g>, and <b> are relatively close in value, saturation is rarely a problem. However, to avoid any possibility of saturation and clipping of saturated values, at the cost of less efficient entropy correction, ERU 300 can check the r', g', and b' values in the block to determine whether saturation occurred within that block (Step 436); if it did, ERU 300 can change the appropriate adjustment value(s) by the amount necessary to minimize saturation and use the new adjustment value(s) in all the corresponding pixels of that block (Step 438). If avoiding saturation is not important, the foregoing steps can be skipped, and the system will simply clip the saturated values (Step 435).

As before, the ERU stores the r', g', and b' values in an $M_e$ plane (Step 440) and separately stores the adjustment values $A_r$, $A_g$, and $A_b$ for each block in a buffer memory (Step 442). After compression, transmission, and decompression of the $M_e$ plane and after transmission of the average values, ERU$^{-1}$ 330 uses the $A_r$, $A_g$, and $A_b$ values to perform the inverse operation on each pixel in $M_e$ plane 302 to reconstruct M* plane 332 (Step 444) which is then decoded by demultiplexer 50. The target value A may be chosen in many ways, for example, so the r', g', and b' values saturate only at the high end, or only at the low end,, or equally at the high and low ends as in the example above, or with any other criterion. In any case A should always fall somewhere between $A_{max}$ and $A_{min}$ or unnecessary clipping could occur in all planes.

Combination Entropy Reduction of The M Plane

Figure 12C:
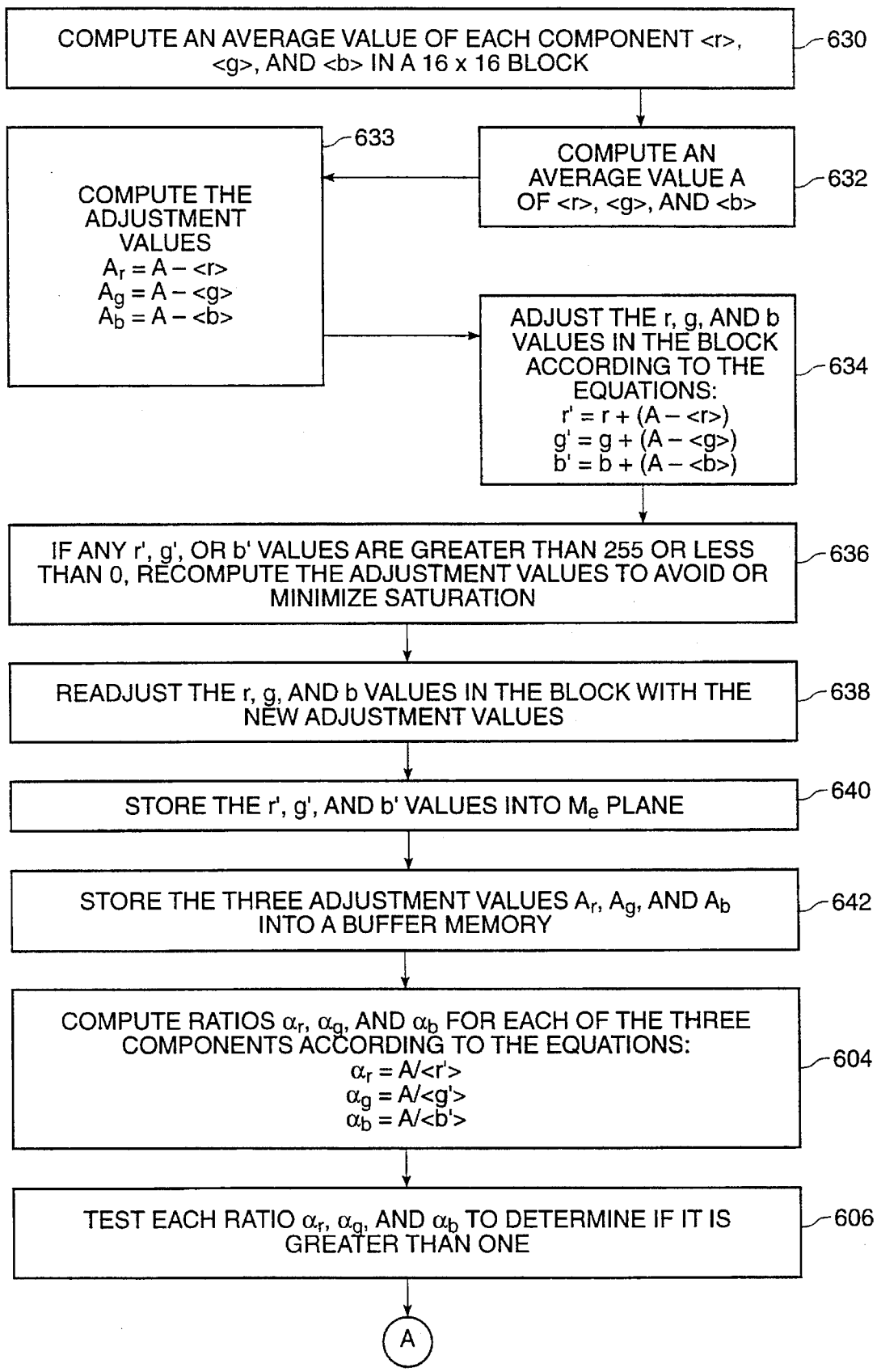
FIGS. 12C and 12D are together a block diagram of the operation of the entropy reduction unit arid inverse entropy reduction unit according to the embodiment of the invention that uses combination entropy reduction.
Figure 12D:
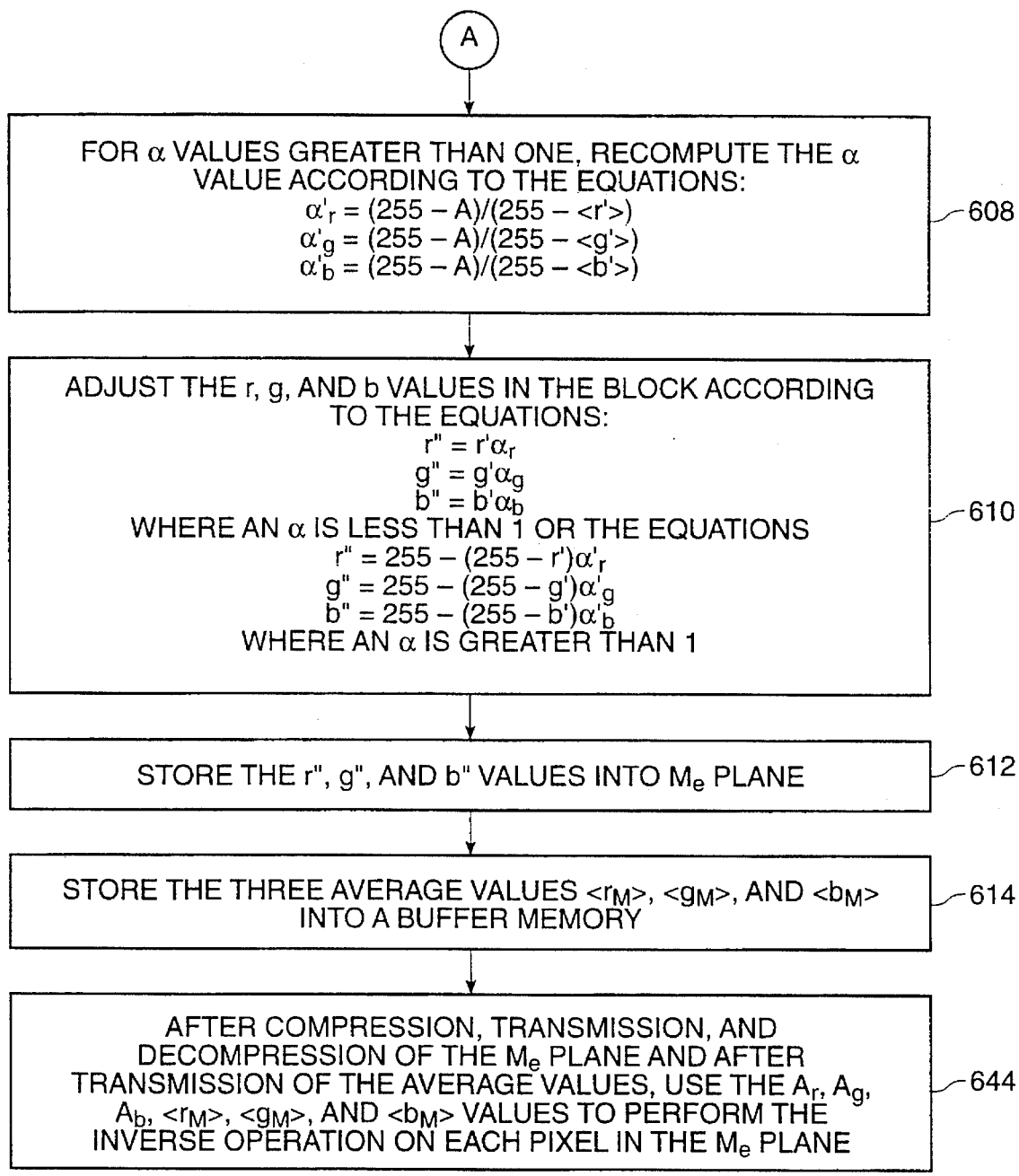

The multiplication and additive entropy-correction schemes described above can be combined to achieve even superior performance. In FIGS. 12C and 12D, in a combination method, ERU 300 first uses the additive entropy reduction method described before (without clipping) to bring the individual primary averages as close to the common value as possible without saturation and stores the first three average values $A_r$, $A_g$, $A_b$ for each block (Steps 630, 632, 633, 634, 636, 638, 640, 642). ERU 300 next applies to the additively replaced M plane the multiplicative entropy reduction method described before and stores the second three average values $<r_M>$, $<g_M>$, $<b_M>$ from this method for each block (Steps 604, 606, 608, 610, 612, 614). ERU 300 transmits the entropy-reduced $M_e$ plane along with the six values for each block $A_r$, $A_g$, $A_b$, $<r_M>$, $<g_M>$ and $<b_M>$ to JPEG circuit 310 (Step 644) which then sends it to storage transmission unit 40. After transmission, ERU$^{-1}$ 330 first performs inverse multiplicative entropy reduction and then performs inverse additive entropy reduction to produce a restored M* plane. This combining of additive and multiplicative entropy reduction reduces the entropy of the multiplexed array without saturation and with minimal quantization effect.

Tuning The JPEG Quantization Table

For optimum compression of the M plane using a compression scheme such as JPEG, one operation in addition to entropy reduction can be performed. This operation can be performed instead of entropy reduction or in combination with entropy reduction. This operation involves tuning the compression scheme's quantization table either to the characteristics of the multiplexed M plane or to the characteristics of entropy-reduced $M_e$ plane. A general description of the JPEG quantization table is found in the published standards literature and is not necessary to an understanding of the invention. When using JPEG the quantization table is tuned to the spatial frequency characteristics of the multiplexer plane by the method explained below.

Figure 14:
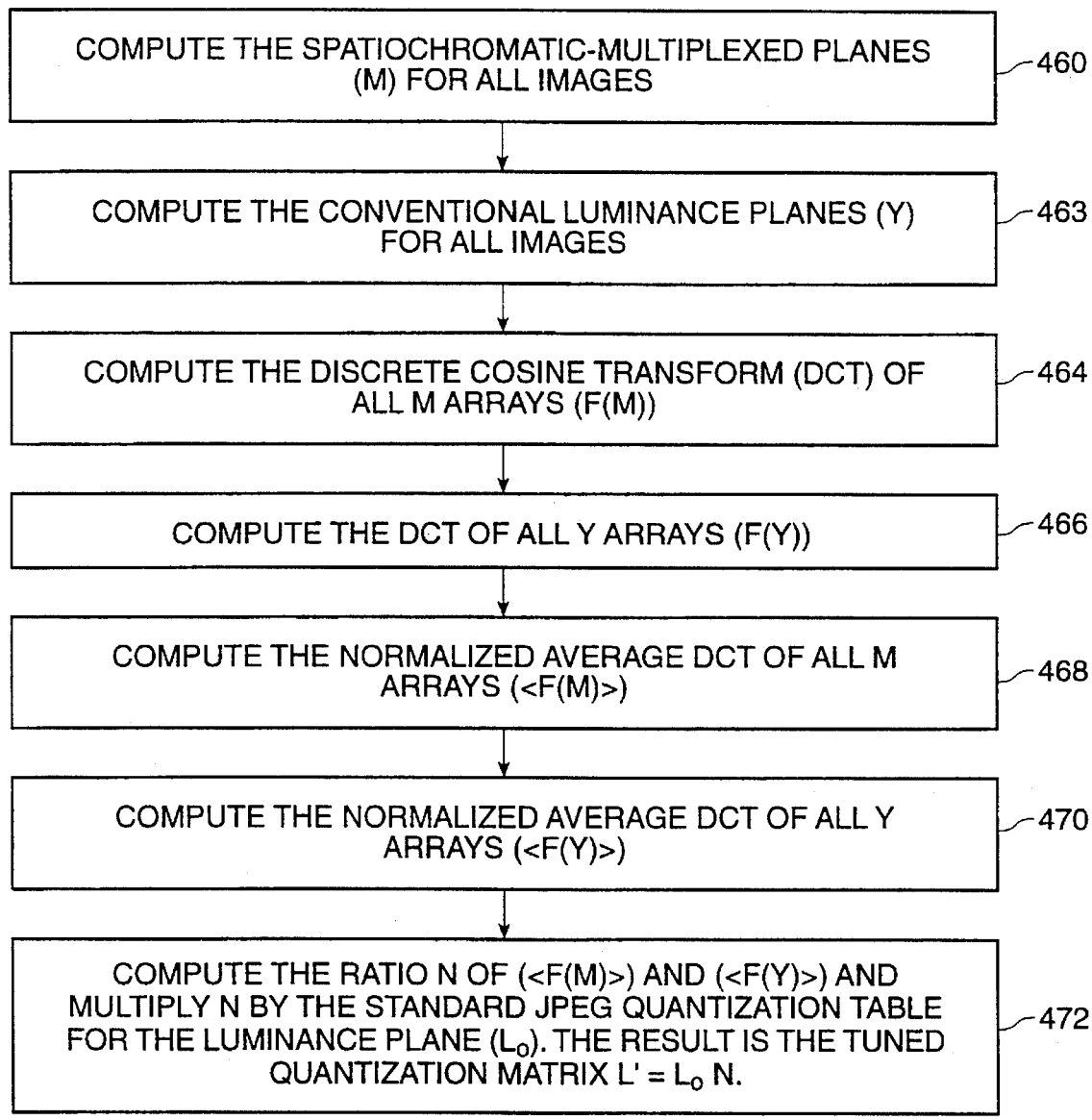
FIG. 14 is a block diagram of a method for tuning the quantization matrix of a JPEG compression scheme for use with a multiplexed plane.

FIG. 14 is a flow chart of a method for tuning the JPEG quantization table to the spatial frequency characteristics of the multiplexed M plane. The procedure starts with a set of RGB digital color images (Step 460). The tuning will be most efficient for these images and any other image with similar characteristics; thus, the set of images should be as representative as possible. (If extra computation is not a disadvantage, the matrix tuning can be customized independently for each image.) Thereafter, the system computes conventional luminance planes (Y) for all images (Step 463) and then computes the Discrete Cosine Transform of all M arrays F(M) (Step 464) and of all Y arrays F(Y) (Step 466). Then the system computes the normalized average DCT of all M arrays <F(M)> (Step 468) and of all Y arrays <F(Y)> (Step 470). The system then computes the ratio N of the two normalized averages of <F(M)> and <F(Y)> and multiplies the ratio N by the standard JPEG quantization table for luminance $L_0$ to produce a tuned quantization matrix L' (Step 472). Multiplication and division between arrays of numbers in this technique are understood to be on an element by element basis, and not as matrix multiplication or division.

Specific Circuit Embodiments

Figure 15:
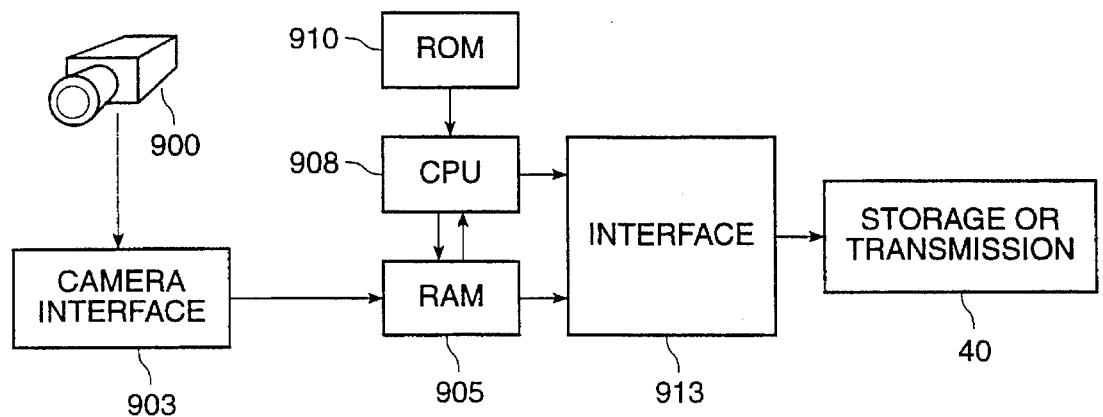
FIG. 15 is a schematic block diagram of a system for compression of images designed to operate in accordance with one embodiment of the invention.
Figure 16:
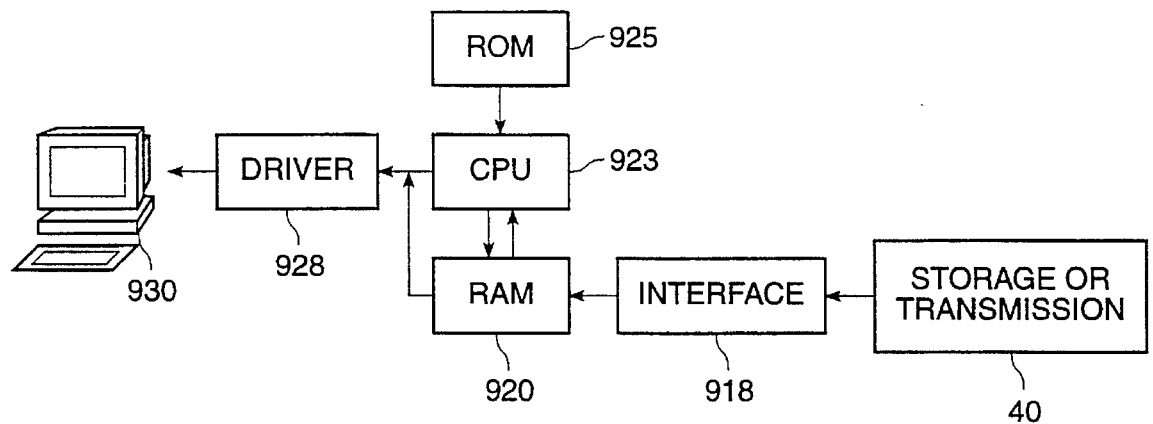
FIG. 16 is a schematic block diagram of a system for decompression of images designed to operate in accordance with a further embodiment of the invention.

FIG. 15 is a block diagram of a general purpose system designed to practice the multiplexing and encoding functions of the invention, and FIG. 16 is a block diagram of a general purpose system designed to practice the demultiplexing and decoding functions of the invention.

In FIG. 15, input device 900 is any device capable of capturing multiple planes of a multi-spectral image, such as full RGB planes of a color image or any correlated bands from a multi-spectral image as might be captured by an orbiting satellite. Interface circuit 903 is logic circuitry that translates the signals from input device 900 into a digital three-plane array and stores the digital three-plane array in random access memory (RAM) 905. Input device 900 and interface 903 may be any of a number of devices to capture multi-spectral, for example, color digital images. For example, input device 900 could be a flat-bed digital color scanner in which case interface circuit 903 would be the analog-to-digital converter circuit within the scanner that translates the scanner signals to digital pixel values. The process of capturing the image, translating it into a digital representation and storing it in RAM memory may take place any time prior to the multiplexing function, and any number of images may be stored prior to multiplexing.

Central processing unit (CPU) 908 may be one of a number of types of microprocessors. In one embodiment of the invention, CPU 908 is a standard microprocessor which is part of a general purpose computer. In another embodiment of the invention, CPU 908 has an architecture specially constructed from bit-slice or custom fabrication technology and optimized in order to increase the speed of the processing needed to practice the invention.

Read only memory (ROM) 910 contains instructions that direct CPU 908 in the processing of the image according to the invention.

Once a multi-plane digital image is present in RAM 905, CPU 908, operating according to the instructions in ROM 910, performs any of the multiplexing and encoding operations described above to produce a compressed data representation of the image. CPU 908 then stores this compressed data representation in RAM 905. In one embodiment of the invention, these steps include creating a multiplexed M plane (as illustrated in FIG. 3), reducing the entropy of the M plane to form an $M_e$ plane (as illustrated in FIGS. 12A and 12B), performing a JPEG compression of the $M_e$ plane using a tuned quantization matrix stored in ROM 910, and finally signaling interface unit 913 to commence transmission of the compressed data representation of the image to storage or transmission unit 40. As described above, the storage or transmission unit can be any means for storing or transmitting digital information, such as a shared or stand alone computer hard disk or a digital network connecting two or more computers. While FIGS. 15 and 16 illustrate two separate devices for multiplexing and demultiplexing, the invention can be usefully practiced on a single stand alone computer system to allow for compressed storage of images and for their retrieval and display.

FIG. 16 shows a general purpose system designed to receive, decompress and display images represented as a compressed data set. It operates as an inverse of the device of FIG. 15. Interface circuit 918 receives the signals from storage or transmission device 40 and stores the compressed data set in random access memory (RAM) 920.

Central processing unit (CPU) 923 like CPU 908, may be either a standard microprocessor which is part of a general purpose computer or a specially constructed microprocessor. Read only memory (ROM) 925 contains instructions that direct CPU 923 in processing of a compressed data set according to the invention.

Once a compressed data set is present in RAM 920, CPU 923, operating according to the instructions in ROM 925 performs demultiplexing and decoding operations described above that correspond to and are the inverse of those operations used to produce the compressed data representation of the image by CPU 908. In one embodiment these steps include performing a $JPEG^{-1}$ decompression of the compressed data set using a tuned quantization matrix to reconstruct an $M_e$ plane, restoring the entropy of the $M_e$ plane to reconstruct an M plane (as illustrated in FIG. 12), decoding the strong plane values of the M plane through a correlated decoding process (as illustrated in FIGS. 8A and 8B), correcting for speckles in the strong planes (as illustrated in FIGS. 10A and 10B) and decoding the weak plane values (as illustrated in FIGS. 9A and 9B). As CPU 923 performs these decoding functions, the decoded data is stored in RAM 920. Once the decoding functions are complete, a resulting RGB decoded image in RAM 920 is transmitted to display driver 928 for display on output device 930.

Improving The Resolution of a Multi-CCD Camera

In a further aspect of the invention, the invention may be used to increase the resolution of a multi-spectral imaging device that uses multiple CCD sensors. In one specific example of this embodiment, a digital camera employs two or more separate CCD arrays to capture separate and complete spectral component planes. The highest quality image-capture systems commonly in use utilize triple-CCD sensor arrays, with the optical path divided by beam splitters so that a portion of the incoming light falls on each sensor array with, for example, one sensor array being a red sensor, one being a green sensor, and one being a blue sensor. In typical prior art CCD cameras, care is taken to ensure that the sensors are in tight registration, i.e., that the image falls on each of the three sensor arrays in exactly the same position. In a camera built according to the invention, the sensors are deliberately offset one from another by a fraction of a pixel (for example, one half a pixel).

Figure 17:
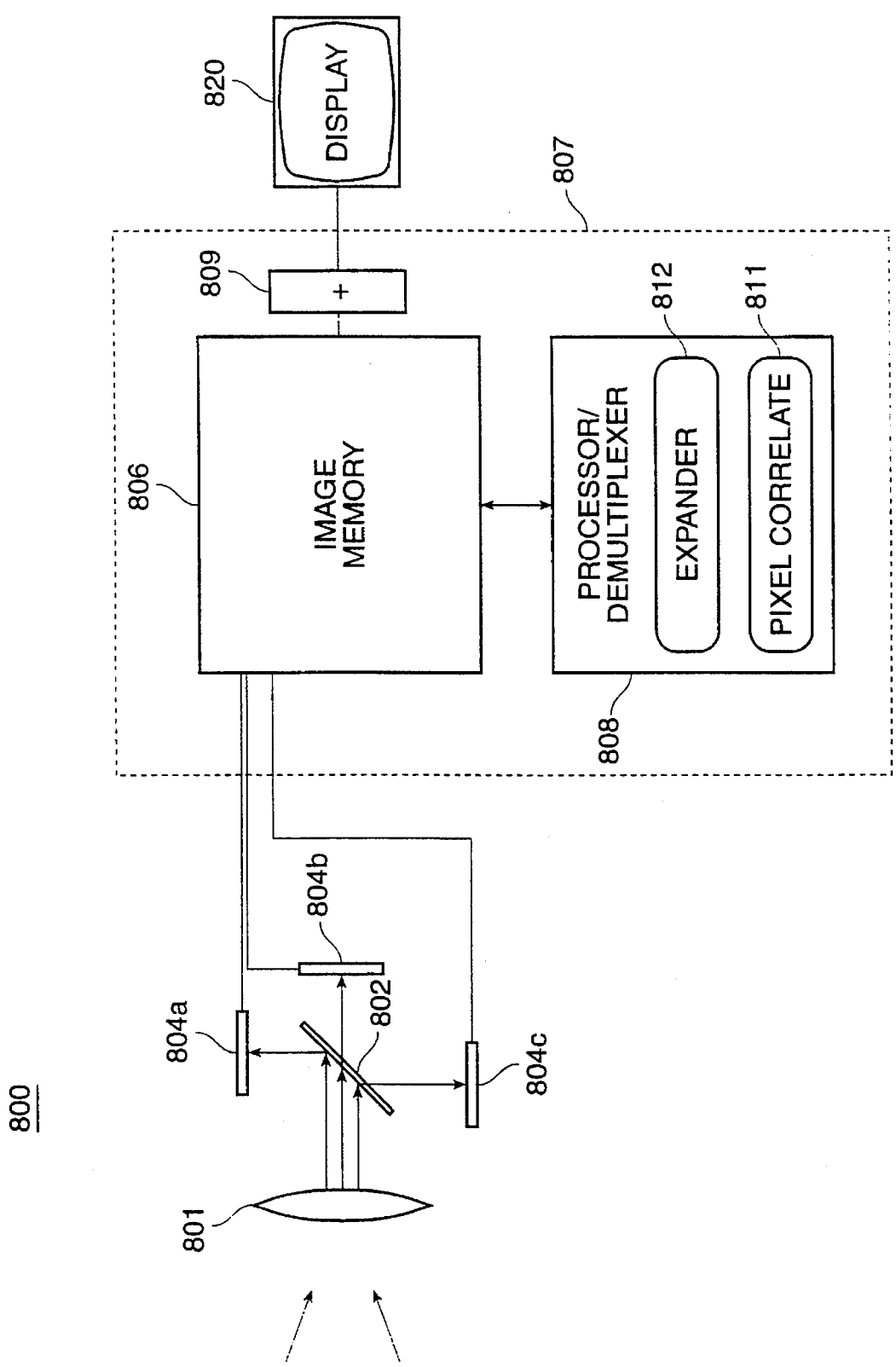
FIG. 17 is a schematic block diagram of a three sensor CCD camera with enhanced resolution in accordance with a further embodiment of the invention.

FIG. 17 shows a CCD camera 800 built according to the present invention. Light from an image is incident on lens 801, which focuses the light onto beam-splitter 802. Beam-splitter, shown in schematic form, 802 splits the image into three copies, directing one of the three copies to each of image sensors 804a, 804b, and 804c. Sensors 804a–c each capture an array of digital values for one spectral component of the image plane of light and store those values in a memory 806. Once the image is captured by the three sensors and stored, image enhancement according to the invention is accomplished by decoder 807. Decoder 807 is comprised of image memory 806, a processor/demultiplexer 808, and an image combinor/display driver 809. Processor 808 decodes and enhances the resolution of the image stored in memory 806 by a method of correlated decoding to be more fully described below. Two of the important subsystems of processor 808 are shown, image expander 810 and pixel correlator 811. While the image enhancement aspects of this invention are being described with respect to a particular CCD camera, it will be apparent to one skilled in the art that the same resolution enhancement technique could be employed in a different type of image device, such as a flat bed scanner, or in a device that handles non-visible-light based images such as a satellite imager, X-ray imager, or infrared detecting device or in a CCD camera with a different configuration.

As described above, the sensors 804a–c are offset with respect to one another in the CCD camera and the resulting image is then decoded to enhance image resolution. This aspect of the invention will be better understood with reference to FIGS. 18A–D.

Figure 18A:
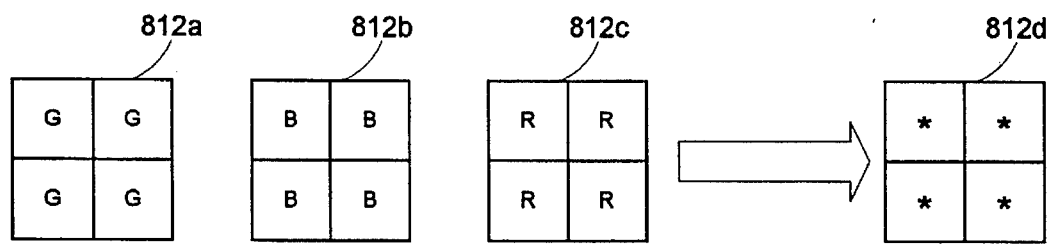
FIG. 18A is a block diagram illustrating overlapping CCD planes to form an RGB image in accordance with known methods.

FIG. 18A is a representation of three planes produced by a typical multi-CCD camera. The 3 CCD sensors are represented by the 2×2 pixel arrays 812a–c and are adjusted spatially to be in accurate registration. The resulting composite CCD image is represented by RGB pixel image 812d, which is shown to have the three sensor arrays superimposed on one another with the centers of corresponding pixels in alignment. In the figure, the symbol * is used to represent the overlaid R, G, and B pixels. Image 812d has the same pixel size and pixel density as the three sensor arrays, with the R, G, and B values superimposed directly on top of each other. With such a configuration, the resolution of the image is determined by the spatial resolution of the CCD sensors.

Figure 18B:
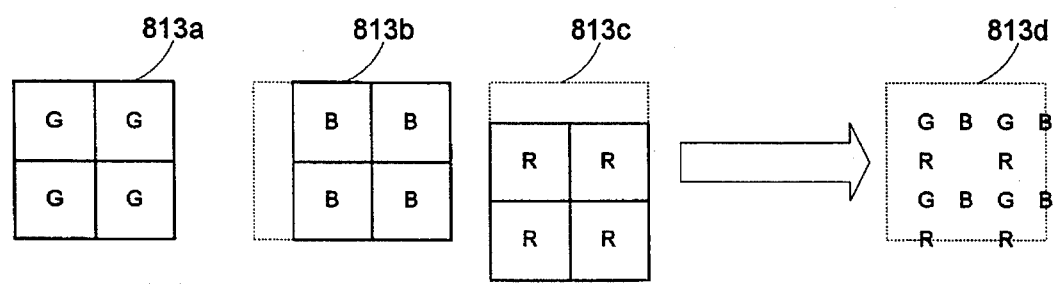
FIG. 18B is a block diagram illustrating an image produced by offset CCD planes in accordance with an embodiment of the invention.

FIG. 18B illustrates a technique according to the invention by which a major improvement in resolution is possible simply by shifting the relative positions of the CCD sensors and decoding the resulting array of pixel values using correlated decoding techniques according to the invention. In FIG. 18B, the blue CCD 813b is shown shifted in position a half-pixel horizontally and the red CCD 813c a half-pixel vertically each with respect to green CCD 813a. In the resulting overlaid pixel image 813d, the centers of the R, G, and B pixels are not in alignment, but are offset one half pixel from each other. It will be helpful for understanding the invention to notice that the pixel image in FIG. 813d actually contains more information about a real world image than the pixel image in FIG. 812d. This is because, as described above, in real world images the separate color components tend to be highly correlated. Therefore, the R, G, and B values each effectively carry information about the other two values at that location. With the CCD sensors offset, more dense spatial information is gathered by the three sensors. While the specific embodiment herein illustrated and described shows one sensor array offset vertically and one horizontally, it will be obvious that the invention may be practiced with the sensor arrays offset laterally in any direction.

Figure 18C:
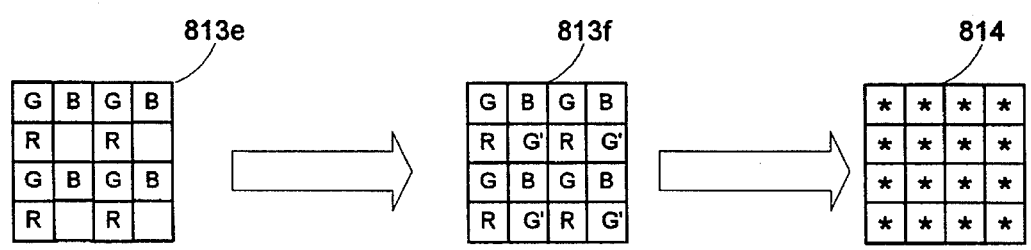
FIG. 18C is a block diagram illustrating creating a fourth image plane containing average green values in accordance with an embodiment of the invention.

FIG. 18C illustrates the steps by which pixel image 813d may be interpreted and then decompressed or decoded to achieve enhanced resolution, such as is done by decoder 808 according to the invention. The 2×2 RGB offset pixel image of 813d is first interpreted as a 4×4 multiplexed image plane having pixels that are ¼ the area of the original pixels. This results in pixel image plane 813e. In odd numbered rows there are alternating G and B samples at twice the resolution of the CCD sensors; in even rows there are alternating R samples and blank spaces. Note that this image plane resembles the spatiochromatically multiplexed planes of FIGS. 4 and 5. According to the invention, this plane may be decoded (or demultiplexed) by decoder 807 to achieve a full RGB 4×4 image plane using a method like the method for demultiplexing the M plane described above.

Decompressing the Single-Plane Array

The first step in decoding array 813e is to fill the empty holes in the even rows. One method that the invention may employ to do this is to fill each space with an average value, G', of the four surrounding G values, as shown in plane 813f. The result of such a filling in is that green has twice the representation of red or blue. An alternative filling-in scheme would be to utilize a fourth CCD sensor, which is also filtered, for example for green, but is displaced both one-half pixel horizontally and one-half pixel vertically. In that way, true rather than averaged values would be obtained for these G' pixels.

Once the plane 813f contains a value for red, green or blue at each pixel location, the next step is to decode the single plane of mixed R, G, B values to obtain a full, triple-plane RGB image having the promised greater resolution. The pixel distribution shown in plane 813f is a known distribution for color filtering of pixel sensors which is referred to as the Bayer pattern.

According to the present invention, full R, G, and B planes are decoded from plane 813f by the same method of strong plane decoding used to decode or demultiplex the pixel pattern shown in FIG. 5. This decoding is illustrated in FIG. 8A. According to one specific embodiment, at a pixel location where a red sample is present, the missing green and missing blue pixels are decoded by correlating the difference between the red sample and a local average in the red plane with the difference between the missing pixels and a local average in their respective planes; at a pixel location where a green sample is present, the missing red and missing blue pixels are decoded by correlating the difference between the green sample and a local average in the green plane with the difference between the missing pixels and a local average in their respective planes; and at a pixel location where a blue sample is present, the missing green and missing red pixels are decoded by correlating the difference between the blue sample and a local average in the blue plane with the difference between the missing pixels and a local average in their respective planes. Note that this is the same correlated decoding done with respect to just the strong red and strong green planes described above.

This correlated decoding may also be understood in terms of the equation written above to describe the operation of demultiplexer 50. That equation is reproduced here for the correlated decoding of a missing green pixel: $g_c = k_1 r_s - k_2 \langle r \rangle + k_3 \langle g \rangle$, where the k values are constants. This same equation represents the operation of processor 808 when decoding a missing green pixel at a location that contains a sampled red pixel. However, as can be seen by reference to FIG. 813f, some of the missing green pixels are at locations where a blue sample is present. These missing green pixels are therefore correlated with a blue sample, which correlation may be represented by the equation: $g_c = k_1 b_s - k_2 \langle b \rangle + k_3 \langle g \rangle$. Likewise, missing red pixels are correlated with either green or blue samples depending on which color plane has a sampled pixel at the missing red location, and missing blue pixels are correlated with either green or red samples depending on which color plane has a sampled pixel at the missing blue location.

A number of variations of the system illustrated by FIGS. 17 and 18 are possible. While typical pixel detectors in use today are roughly square, any other geometrical shape could be used such as triangular detectors or circular detectors. In addition, some combination of differently shaped detectors may be packed together to form a sensor array. It will be obvious to one of skill in the art that the invention may be practiced using any shape of pixel detector. Another possible variation to the system shown in FIG. 17 is that beam splitter 802 could split the image into four beams with each landing on one of four image sensors, each of the four sensors offset from each other. In this variation, two of the sensors will detect light of the same color, such as two green sensors. With four sensors, it will be unnecessary to compute a fourth image plane before commencing correlated decoding because the system will directly capture four planes of data.

Masked or Apertured CCD's

Figure 18D:
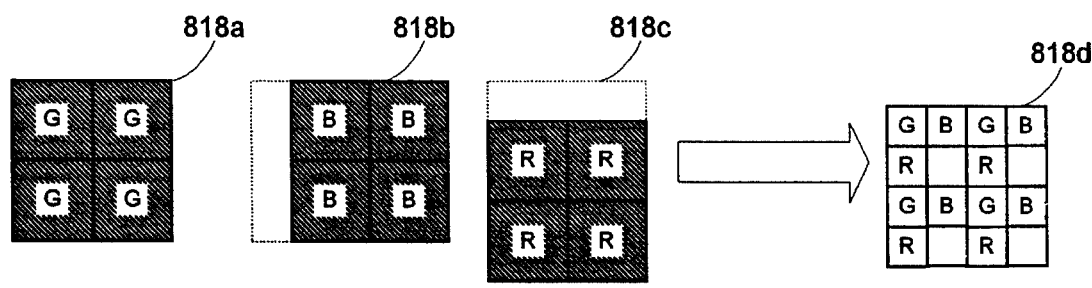
FIG. 18D is a block diagram illustrating a pixel plane produced by apertured offset CCD planes in accordance with an embodiment of the invention.

FIG. 18D illustrates a further improvement that may be made to a multiple sensor with offset imaging according to the invention. This improvement is the use of masks or apertures on each CCD detector so that the light falling on the CCD detector is more nearly limited to light falling at the center of the detector. Superior image resolution is achieved by decoding plane 813f when the pixel values in the plane are derived from apertured CCD's such as shown in FIG. 18D where the aperture or mask over the detector is, for example, the same size as the pixel size in plane 813f. This further improved resolution results from the fact that the apertures eliminate the pixel overlap that occurs when plane 813f is derived from larger pixels as shown in FIG. 18B. The apertured CCD's actually capture more precise information relevant to the decoding process by detecting light that falls primarily at the center of the CCD. The cost is a loss of light falling on the CCD detectors, thus possibly degrading performance in low-light environments.

The invention has now been explained with reference to specific embodiments. Other embodiments will be apparent to those of ordinary skill in the art upon reference to this specification. It will be obvious to one of skill in the art that many of the disclosed details of the devices and methods described herein can be varied without changing the essential nature of the invention. It is therefore not intended that this invention be limited, except as indicated by the appended claims.

What is claimed is:

1. An image decoder capable of increasing the resolution of a multi-spectral image comprising:

an image storage capable of receiving and storing a multi-spectra image as at least two separable planes of digitized spectral components, each of said planes comprised of a plurality of pixels;

a processor for increasing pixel density in at least one of said separable planes by determining an interstitial pixel value in said plane by a process of correlated decoding, wherein said interstitial pixel value is set so that a first difference value between said interstitial pixel value and a local average value in one of said planes is correlated to a second difference value between an known pixel value at a corresponding pixel location in a different plane and a local average in said different plane; and an image combined/driver capable of joining said at least two separable planes including said increased density plane(s) into a representation of a resolution enhanced multi-spectral visual image.

2. A decoder capable of decoding a multi-spectral image wherein said multi-spectral image is represented as a spatially multiplexed image plane comprising:

an image store capable of capturing the multi-spectral image as a single spatially-multiplexed digitized image plane, said image plane comprising at each pixel location a representation of a single spectral component;

a processor comprising:

an image expander capable of expanding said spatially-multiplexed digitized image plane into a plurality of separable component planes, said separable component planes initially comprised of a plurality of pixels of known value and a plurality of pixels with missing values;

a pixel correlater capable of determining a missing pixel value in one of said plurality of component planes wherein said missing pixel value is set so that a first difference value between said missing pixel value and a local average value in one of said reconstructed separable planes is correlated to a second difference value between a known pixel value at a corresponding pixel location in a different reconstructed plane and a local average in said different reconstructed plane; and an image combiner/driver capable of combining said reconstructed separable planes into a composite visual image.

3. An apparatus for decoding a multi-spectral image wherein said multi-spectral image is represented as a spatially multiplexed image plane comprising:

means for capturing the multi-spectral image as a single spatially-multiplexer digitized image plane, said image plane comprising at each pixel location a representation of a single spectral component;

means for expanding said spatially-multiplexed digitized image plane into a plurality of separable component planes, said separable component planes initially comprised of a plurality of pixels of known value and a plurality of pixels with missing values;

correlated decoding means capable of determining a missing pixel value in one of said plurality of component planes wherein said missing pixel value is set so that a first difference value between said missing pixel value and a local average value in one of said reconstructed separable planes is correlated to a second difference value between a known pixel value at a corresponding pixel location in a different reconstructed plane and a local average in said different reconstructed plane; and means for presenting said plurality of reconstructed separable planes as a visual image.

4. The apparatus according to claim 1 wherein said multi-spectral image is a color image comprising a digitized red plane, a digitized green plane, and a digitized blue plane.

5. The apparatus according to claim 2 wherein said multi-spectral image is a color image comprising a digitized red plane, a digitized green plane, and a digitized blue plane.

6. The apparatus according to claim 3 wherein said multi-spectral image is a color image comprising a digitized red plane, a digitized green plane, and a digitized blue plane.

7. A method for increasing the pixel density of a multi-spectral image comprising:

capturing a multi-spectral image in at least two separable digitized planes suited to be combined to form said multi-spectral image, said separable planes comprising known and missing pixel values;

decoding said separable planes by a method of correlated decoding comprising setting a missing pixel value so that a first difference value between said missing pixel value and a local average value in one of said separable planes is correlated to a second difference value between a known pixel value at a corresponding pixel location in a different separable plane and a local average in said different separable plane;

combining said separable planes after decoding to produce a multi-spectral image with increased pixel density from said captured multi-spectral image; and presenting said multi-spectral image with increased pixel density.

8. The method according to claim 7 wherein said capturing step comprises capturing said image by at least two pixel component sensors, said pixel component sensors each comprising an array of individual pixel sensors, each of said sensor arrays being offset a fraction of a pixel from each other sensor array.

9. In a digital camera comprising a plurality of spectral sensors, each sensor comprised of an array of pixel detectors, a method for enhancing image resolution comprising:

offsetting each sensor a fraction of a pixel in a lateral direction from each other sensor;

capturing a multi-spectral image in at least two separable digitized planes using said offset sensors, said separable digitized planes having a number of pixel storage locations greater than the number of pixel detectors in said sensors, said separable planes only partially filled by pixel values from said sensors;

determining missing pixel values in said separable planes by a method of correlated decoding comprising setting a missing pixel value so that a first difference value between said missing pixel value and a local average value in one of said separable planes is correlated to a second difference value between a known pixel value at a corresponding pixel location in a different separable plane and a local average in said different separable plane; and presenting said plurality of reconstructed planes as a visual image whereby said visual image has enhanced image resolution from that achievable with non-offset sensors of the same pixel density.

10. The method according to claim 9 further comprising providing a mask at each sensor plane such that the light detected at a plurality of pixel detectors is limited to a smaller area than that available without the mask.

11. The method according to claim 9, wherein said image is captured by three sensors, a sensor for red light, a sensor for green light and a sensor for blue light, said three sensors producing three separable digitized image planes and further comprising the step of average plane decoding whereby a fourth image plane is computed prior to said correlated decoding step, said fourth plane computed by interpolating said missing pixel values from present values in one of said captured planes.

12. An apparatus for increasing the pixel density of a multi-spectral image comprising:

means for capturing the multi-spectral image in at least two captured planes of digitized separable multi-spectral components;

averaging means coupled to said image capturing means for determining local average digital values in one of said planes thereby creating an averaged plane;

selecting means coupled to said averaging means and to said image capturing means for spatially multiplexing said captured plane values and said average plane values in order to generate a single-plane spatially-multiplexed digital plane such that said spatially-multiplexed digital plane contains, at each pixel location, a pixel value from one of said captured planes or from said averaged plane;

means for expanding said spatially-multiplexed digitized image plane into a plurality of expanded component planes, said expanded component planes initially comprised of a plurality of pixels of known value and a plurality of pixels with missing values;

correlated decoding means capable of determining a missing pixel value in one of said plurality of component planes wherein said missing pixel value is set so that a first difference value between said missing pixel value and a local average value in one of said reconstructed separable planes is correlated to a second difference value between a known pixel value at a corresponding pixel location in a different reconstructed plane and a local average in said different reconstructed plane; and means for presenting said plurality of reconstructed separable planes as a visual image.

13. A camera system with enhanced resolution comprising:

a plurality of spectral component sensors, each sensor comprising an array of pixel detectors;

an image splitter capable of splitting spectral energy from an image source such that said spectral energy reaches each of said spectral component sensors, said sensors and said image splitter arranged so that spectral energy falling on at least one such sensor is offset a fraction of a pixel from the spectral energy falling on another such sensor; and a decoder capable of decoding digital pixel information generated by said offset component sensors using a method of correlated decoding whereby resolution is enhanced in at least one spectral component plane by correlating the difference between an interstitial pixel value in said plane and a local average value in said plane to a second difference value in a second spectral component plane said second difference being the difference between a known pixel value at that location in said second plane and a local average in said second plane.

14. A camera system with enhanced resolution comprising:

a plurality of spectral component sensors, each sensor comprising an array of pixel detectors, one sensor being a red sensor, one sensor being a green sensor, and one sensor being a blue sensor;

an image splitter capable of splitting light from an image source such that said light reaches each of said spectral component sensors, said sensors and said image splitter arranged so that spectral energy falling on at least one such sensor is offset a fraction of a pixel from the spectral energy falling on another such sensor;

a pixel memory capable of storing pixel information from said sensors and capable of holding a representation of said image comprising for at least one spectral component a number of pixels that is a multiple of the number of pixels in said sensor array said pixel memory being only partly filled by data from said component sensors;

a decoder capable of decoding digital pixel information generated by said component sensors using a method of correlated decoding whereby resolution is enhanced in at least one spectral component plane by correlating the difference between an interstitial pixel value in said plane and a local average value in said plane to a second difference value in a second spectral component plane said second difference being the difference between a known pixel value at the interstitial location in said second plane and a local average value in said second plane.

15. A method for enhancing image resolution in a digital camera comprising a plurality of spectral sensors, each sensor comprised of an array of pixel detectors, comprising:

offsetting laterally each sensor a fraction of a pixel from each other sensor;

capturing a multi-spectral image in three separable digitized planes, a red plane, a green plane, and a blue plane, using said offset sensors, said separable digitized planes having a pixel size that is a fraction of the pixel size of said sensors, said separable planes only partially filled by pixel values from said sensors;

producing at least a fourth separable digitized image plane from one of said red, blue, or green planes, said fourth plane comprising a pixel value at each pixel location that corresponds to a location where there is no detected red, green, or blue value;

determining missing pixel values in said separable planes by a method of correlated decoding comprising setting a missing pixel value so that a first difference value between said missing pixel value and a local average value in one of said separable planes is correlated at least to a second difference value between a known pixel value at a corresponding pixel location in a different separable plane and a local average in said different separable plane; and presenting said plurality of reconstructed planes as a visual image whereby said visual image has enhanced resolution from that obtainable from a digital camera with the same size pixel detectors not employing said capturing, said offsetting, said producing, and said determining steps.

16. The method according to claim 15 further comprising providing an aperture at each sensor such that the light detected at each pixel detector is limited primarily to light falling near the center of the detector.

17. The method according to claim 9, wherein said image is captured by at least four sensors.

* * * * *